US012570849B2

(12) United States Patent
Voeks et al.

(10) Patent No.: US 12,570,849 B2
(45) Date of Patent: Mar. 10, 2026

(54) ADDITIVE MANUFACTURING COMPOSITIONS AND METHODS

(71) Applicant: Polynt Composites USA, Inc., Carpentersville, IL (US)

(72) Inventors: Steven L. Voeks, Smithville, MO (US); John Robert Ilkka, Royal Oak, MI (US); Robert M. Adams, Overland Park, KS (US); Allen Chanzhe Lee, Durham, NC (US); Michael Allen Mathews, Glenview, IL (US)

(73) Assignee: Polynt Composites USA, Inc., Carpentersville, IL (US)

( * ) Notice: Subject to any disclaimer, the term of this patent is extended or adjusted under 35 U.S.C. 154(b) by 170 days.

(21) Appl. No.: 18/520,261

(22) Filed: Nov. 27, 2023

(65) Prior Publication Data

US 2024/0101815 A1     Mar. 28, 2024

Related U.S. Application Data

(63) Continuation of application No. 16/889,551, filed on Jun. 1, 2020, now Pat. No. 11,866,577.

(60) Provisional application No. 62/854,857, filed on May 30, 2019.

(51) Int. Cl.
| | |
|---|---|
| *C08L 67/03* | (2006.01) |
| *B29C 64/268* | (2017.01) |
| *B33Y 10/00* | (2015.01) |
| *B33Y 70/00* | (2020.01) |
| *B33Y 80/00* | (2015.01) |
| *B29K 67/00* | (2006.01) |
| *C08K 5/14* | (2006.01) |

(52) U.S. Cl.
CPC ............ *C08L 67/03* (2013.01); *B29C 64/268* (2017.08); *B33Y 10/00* (2014.12); *B33Y 70/00* (2014.12); *B33Y 80/00* (2014.12); *B29K 2067/00* (2013.01); *C08K 5/14* (2013.01)

(58) Field of Classification Search
CPC ............ B33Y 70/00; C08L 67/06; C08K 5/14
See application file for complete search history.

(56) References Cited

U.S. PATENT DOCUMENTS

| | | | |
|---|---|---|---|
| 6,454,972 | B1 | 9/2002 | Morisette et al. |
| 10,196,539 | B2 | 2/2019 | Boonen et al. |
| 2004/0187714 | A1 | 9/2004 | Napadensky et al. |
| 2012/0261060 | A1 | 10/2012 | Jones et al. |
| 2013/0123452 | A1* | 5/2013 | Hage .................. C08K 5/34 |
| | | | 526/330 |
| 2015/0291833 | A1 | 10/2015 | Kunc et al. |
| 2016/0096918 | A1 | 4/2016 | Nava et al. |
| 2017/0057160 | A1 | 3/2017 | Duty et al. |
| 2018/0311891 | A1 | 11/2018 | Duty et al. |

FOREIGN PATENT DOCUMENTS

| | | |
|---|---|---|
| EP | 3711921 | 9/2020 |
| JP | H03210364 | 9/1991 |
| KR | 1020160088311 | 7/2016 |
| WO | WO2016086216 | 6/2016 |
| WO | WO2016191329 | 12/2016 |
| WO | WO2018015553 | 1/2018 |
| WO | WO2018055521 | 3/2018 |
| WO | WO2018055522 | 3/2018 |
| WO | WO2018183806 | 10/2018 |
| WO | WO2019083876 | 5/2019 |

OTHER PUBLICATIONS

Extended European Search Report for European Patent Application No. 20814562.3 dated Jun. 9, 2023, 13 pp.
International Search Report and Written Opinion for PCT/US2020/035581 dated Sep. 16, 2020, 10 pp.
Kishore, et al., "Infrared preheating to improve interlayer strength of big area additive manufacturing (BAAM) components," Additive Manufacturing 14 (2017) 7-12, 6 pp.
Sudbury, et al., An assessment of additive manufactured molds for hand-laid fiber reinforced composites, International Journal of Advanced Manufacture Technology, 90:1659-1664, 2016, 6 pp.

* cited by examiner

*Primary Examiner* — Robert C Boyle
(74) *Attorney, Agent, or Firm* — Neal, Gerber & Eisenberg LLP

(57)     ABSTRACT

A thermosetting composition comprising a crosslinkable component such as a vinyl ester and/or an unsaturated polyester, and an initiator component, such as cumene hydroperoxide or BPO or blends of cumene hydroperoxide and methyl ethyl ketone peroxide. The composition is suitable to be used in additive manufacturing to form objects such as molds or prototypes.

20 Claims, 7 Drawing Sheets

1

ADDITIVE MANUFACTURING COMPOSITIONS AND METHODS

CROSS-REFERENCE TO RELATED APPLICATIONS

This application is a continuation of U.S. patent application Ser. No. 16/889,551, filed on Jun. 1, 2020, which claims the benefit of and priority to U.S. Provisional Application No. 62/854,857, filed on May 30, 2019. Both applications are fully incorporated by reference herein.

JOINT RESEARCH AGREEMENT

Aspects of the present invention were made by or on behalf of the below listed parties to a joint research agreement. The joint research agreement was in effect on or before the date aspects of the present invention were made, and aspects of the present invention were made as a result of the activities undertaken within the scope of the joint research agreement. The parties to the joint research agreement are Polynt Composites USA Inc. and UT-Battelle, LLC.

FIELD

This application relates generally to additive manufacturing compositions and methods. In particular, the present compositions and methods comprise thermosetting materials for making objects by additive manufacturing.

BACKGROUND

Additive manufacturing, also known as three-dimensional (3D) printing, is used in a wide array of industries for the manufacturing of objects. Such additive manufacturing may be performed with polymers, alloys, powders, wires, or similar feed materials that transition from a liquid or granular state to a cured, solid component. Additive manufacturing may be used to quickly and efficiently manufacture three-dimensional objects layer-by-layer.

Polymer-based additive manufacturing is presently accomplished by feeding polymer materials through a nozzle that is precisely located over a bed or other support. Objects are manufactured by the sequential deposition of layers of materials above the previously deposited layers. Large scale polymer based additive manufacturing of objects requires consideration of localized heating and thermal gradients that can cause materials designed for 3D printing to fail due to warping or other deformation. Ovens have been used to encase and control the temperature of 3D printing for some applications, but the use of an oven increases the complexity, cost and flexibility of large-scale additive manufacturing. Although it is desired to perform polymer additive manufacturing outside an oven, in an ambient environment, many polymer materials for additive manufacturing are not compatible with out of the oven printing. Thus, there is a continuing need for improved additive manufacturing materials and methods.

Additive manufacturing techniques and processes generally involve the buildup of one or more materials to make an object, in contrast to subtractive manufacturing methods. Additive manufacturing techniques are capable of fabricating complex components from a wide variety of materials. Generally, a freestanding object can be fabricated from a computer-aided design (CAD) model.

Polymer additive manufacturing generally includes forming and extruding a bead of flowable material (such as a molten thermoplastic material), applying such bead of material in a stratum of layers, to form a facsimile of an object, and machining such facsimile to produce an end product. The process is generally achieved by means of an extruder mounted on an actuator with controlled motion along at least the X, Y, and Z-directions. The extruder deposits beads of the flowable material at precise locations in the X-Y plane to form a layer, then moves in the Z-direction and begins forming the next layer. In some cases, the flowable material, such as, e.g., molten thermoplastic material, may be infused with a reinforcing material (e.g., strands of fiber) to enhance the material's strength. The flowable material, while generally hot and pliable, may be deposited upon a substrate (e.g., a mold), pressed down or otherwise flattened to some extent, and leveled to a consistent thickness, preferably by means of a tangentially compensated roller mechanism. The flattening process may aid in fusing a new layer of the flowable material to a previously deposited layer of the flowable material. In some instances, an oscillating plate may be used to flatten the bead of flowable material to a desired thickness, thus effecting fusion to the previously deposited layer of flowable material. The deposition process may be repeated so that successive layer(s) of flowable material is deposited upon existing layer(s) to build up and manufacture a desired object. The new layer of flowable material is deposited at a temperature sufficient enough to allow the new layer of flowable material to melt and fuse with a previously deposited layer of flowable material, thus producing a solid part.

Polymer additive manufacturing has generally employed thermoplastics. When building with polymers the mechanical strength of a thermoplastic typically increases with the molecular weight and the degree of branching of side chains. Unfortunately, this also results in an elevation of the melt viscosity and melting point. Fused deposition manufacturing (FDM) requires that a layer maintains tolerance immediately after deposition along with a structural bond to subsequent layers. This structural bond is formed by physically pushing the polymer melt into the previous layer. Therefore, the resistance to melt flow is an important parameter and the extrusion of high strength thermoplastics requires elevated temperatures that aggravate thermal distortion.

Kunc et al. U.S. Pat. App. Publication No. 20150291833 discusses methods and compositions for additive manufacturing that include reactive or thermosetting polymers, such as urethanes and epoxies. The polymers are melted, partially cross-linked prior to the depositing, deposited to form a component object, solidified, and fully cross-linked, such as at time or temperature T2 by a downstream curing element. These polymers form networks of chemical bonds that span the deposited layers.

Sand Intl Publication No. WO2016086216A1 discusses a method for additive manufacturing by depositing beads of thixotropic thermosetting polymers, and curing them by exposure to visible or invisible light, UV-radiation, IR-radiation, electron beam radiation, X-ray radiation or laser radiation.

Sand Intl Publication No. WO2016191329A1 discusses an additive manufacturing apparatus for preparing a three-dimensional structure and associated methods, nozzle assemblies, and three-dimensional structures. The additive manufacturing apparatus may include a first container configured to receive a first thermosetting resin component and second container configured to receive a second thermosetting resin component. A nozzle assembly may be fluidly connected to the first and second container and configured to receive the first thermosetting resin component and the second thermosetting resin component, and the nozzle assembly may include a mixing assembly configured to combine the first thermosetting resin component and the second thermosetting resin component to form a multicomponent thermoset resin. The additive manufacturing apparatus may further include a build platform configured to receive one or more layers of the multicomponent thermoset resin to form the three-dimensional structure. The nozzle assembly may be configured to extrude the multicomponent thermoset resin onto the build platform.

Jones U.S. Pat. App. Publication No. 20120261060 discusses polymerizable resins impregnated in fabrics for the purposes of creating composites which generate less heat when curing such that mold life is extended. They claim a relationship between the heat of polymerization and the adiabatic temperature rise of the composite such that the increase is less than 60° C.

Duty et al. U.S. Pat. App. Publication No. 20170057160 discusses a manufactured component, method and apparatus for advanced manufacturing that includes a nozzle for extruding a working material, wherein the polymeric working material includes a carbon fiber reinforced polymer. The build of the component takes place on a work surface at atmospheric temperatures.

Duty et al. U.S. Pat. App. Publication No. 20180311891 discusses an additive manufacturing method and component having a fill layer material injected into voids as a Z-direction liquid nail or pin to provide a better connection between layers. Rather than depositing a complete layer, the extruder stops extruding at certain sections of the layers to leave a void.

Kishore et al., Additive Manufacturing 14 (2007) 7-12 states that the strength of printed parts across successive layers in the build direction (z-direction) can be significantly lower than the corresponding in-plane strength (x-y directions), and considers the use of infrared heating for increasing the surface temperature of the printed layer just prior to deposition of new material to improve the interlayer strength of the components.

Sudbury et al., Int J Adv Manuf Technol. (2017) 90:1659-1664 describes a project whose objective was to use large area additive manufacturing, commonly known as 3-D printing, to create molds for these small-scale production runs and assess the ability to use them for hand layup composites.

Large objects made by polymer additive manufacturing continue to face a number of technical challenges, including the challenge of printing and curing thermosetting materials without pre-heating or secondary exposure to energy for full curing.

SUMMARY

As one aspect of the present invention, additive manufacturing compositions are provided. The additive manufacturing compositions comprise a thermosetting material comprising a cross-linkable component; and an initiator of free-radical cross-linking. When the compositions are deposited in a series of layers, the compositions cure without substantial deformation (such as warping).

In some embodiments of the additive manufacturing compositions and methods, the composition has a peak exotherm temperature of 50° C. or less during curing as one or more deposited layers (including when curing as multiple deposited layers), and/or a peak exotherm temperature of 80° C. or less during curing as a cylindrical mass. Peak exotherm during curing as a deposited layer can be measured by thermal imaging, as described in Example 4. Peak exotherm during curing as a cylindrical mass can be measured by a cup peak exotherm procedure, as described in Example 7. It is desirable that, when the composition is curing, the composition exhibits a peak exotherm that is no more than 40° C. higher, alternatively no more than 35° C. higher, alternatively no more than 30° C. higher, than a temperature at which the composition begins to cure, or that the composition has a rate of enthalpy change of 9.0 J/g-min or less, alternatively 8.0 J/g-min or less, alternatively 7.1 J/g-min or less, alternatively less than 6.0 J/g-min. In some embodiments, the composition is substantially free of gas voids, before curing and/or during curing.

As another aspect, objects are prepared by curing the novel additive manufacturing compositions described herein, wherein the objects comprise a plurality of layers. In some embodiments, at least one of the layers has a length in the X and/or Y direction of 1.0 m or more, and/or the object comprises at least 10 layers.

As yet another aspect, methods of additive manufacturing objects are provided. The methods comprise depositing a first layer of thermosetting material on a support at a deposit temperature. The methods also comprise curing the first layer of the thermosetting material, wherein the peak exotherm temperature during curing is no more than 40° C. higher, alternatively no more than 35° C. higher than the deposit temperature, alternatively no more than 30° C. higher than the deposit temperature. The methods can also comprise depositing a second layer of thermosetting material on the first layer opposite the support while the first layer undergoes exothermic reaction, and the first layer releases heat to the second layer. The methods can also comprise depositing a third layer of the thermosetting material on the second layer and opposite the first layer and the support; curing the thermosetting material deposited as the third layer; and optionally, depositing and curing additional layers until the desired height of the object is achieved.

In some embodiments, the methods comprise applying a first series of layers, wherein the layers of the first series have a mean peak temperature (MPT) during curing; depositing a second series, where the MPT of the second series is within 25° C. of the MPT of the first series. The first series may release heat to the second series. The depositing step can comprise depositing the thermosetting material to achieve a layer with a thickness of 1.27 to 12.7 mm. The curing of the thermosetting material can be at atmospheric temperature, or at a temperature of 20° C. to 50° C., and can be performed without applying secondary energy.

BRIEF DESCRIPTION OF THE DRAWING

The present disclosure can be better understood from the following detailed description when read with the accompanying drawing figure. The features are not necessarily drawn to scale.

DETAILED DESCRIPTION

Figure 1:
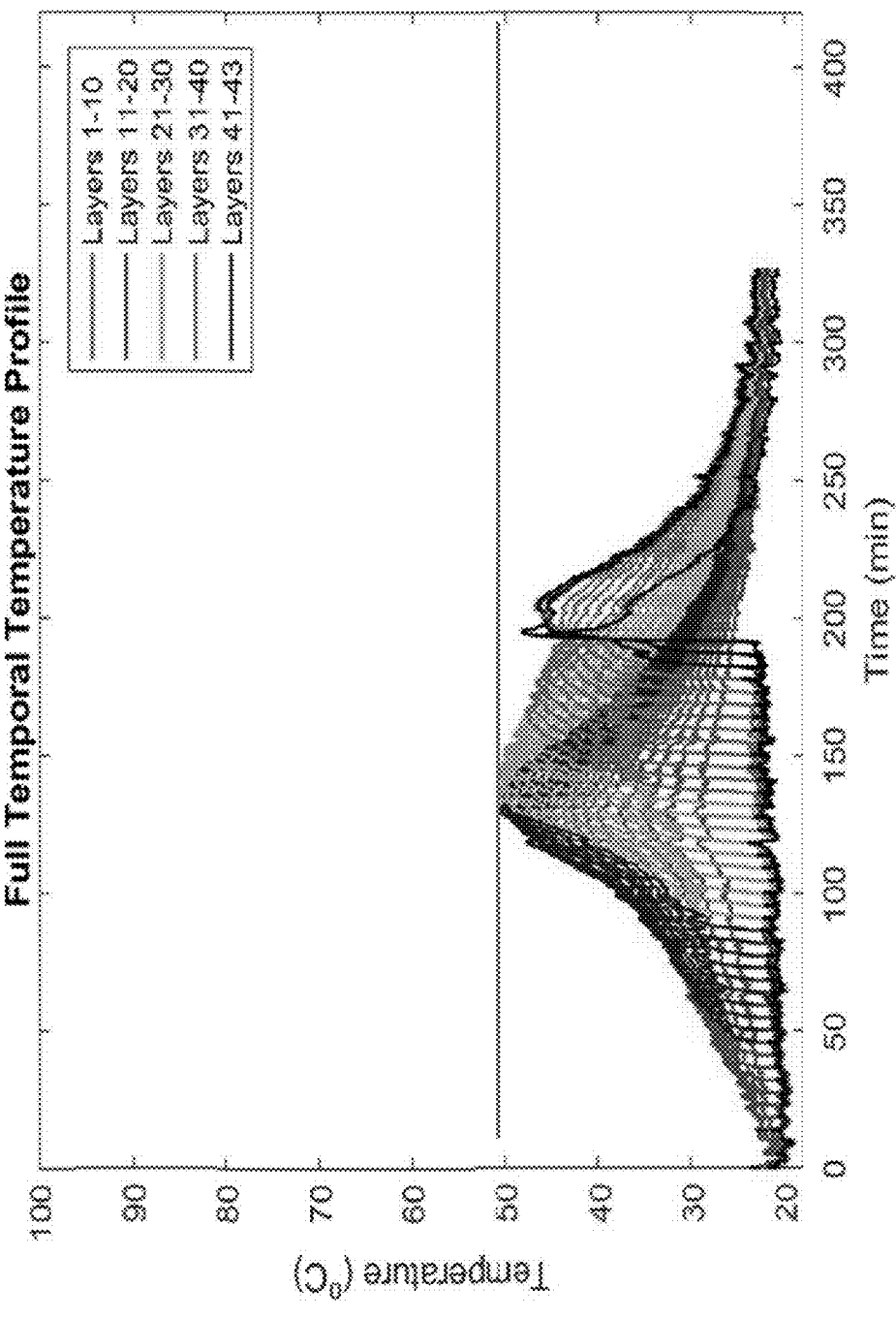
FIGS. 1 and 2 show temperature assessments for a series of layers of thermosetting material deposited according to different embodiments of the present invention.

As one aspect, the present invention provides an additive manufacturing composition comprising a thermosetting material comprising a cross-linkable component; and an initiator of free-radical cross-linking. The thermosetting material and the initiator are selected so that the composition cures without substantial deformation (such as warping) when the composition is deposited in a series of layers.

As another aspect, a method of additive manufacturing an object is provided. The method comprises depositing a first layer of thermosetting material on a support at a deposit temperature; and curing the first layer of the thermosetting material, wherein the peak temperature during curing is no more than 40° C. higher, alternatively no more than 35° C. higher, alternatively no more than 30° C. higher, than the deposit temperature. In some embodiments, the peak exotherm is no more than 25° C. The method can also comprises depositing a second layer of thermosetting material on the first layer opposite the support while the first layer undergoes exothermic reaction, and the first layer releases heat to the second layer. A third layer of the thermosetting material can be deposited on the second layer and opposite the first layer and the support, followed by fourth, fifth, and more layers deposited upon the prior layer, until the desired height of the object is achieved.

In some embodiments, the present methods comprise depositing a first series of layers, wherein the layers of the first series have a mean peak temperature (MPT) during curing. The methods also comprise depositing a second series of layers, where the MPT of the second series is within 25° C. of the MPT of the first series, and the first series releases heat to the second series. The depositing step can comprise depositing the thermosetting material to achieve a layer with a desired thickness, such as a thickness of about 1.27 to about 12.7 mm.

In the present compositions and methods, the rate of heat generation or enthalpy change is limited, thereby reducing, minimizing or eliminating deformation and warpage of objects made with the compositions and methods. More particularly, additive manufacturing compositions which have a rate of enthalpy change of 9.0 J/g-min or less would result in parts made with no deformation or warpage, or substantially free of deformation or warpage. Conversely, parts made with compositions which generated more than 9.0 J/g-min of enthalpy would create some warpage. Controlling the rate at which enthalpy changes or heat is generated can be achieved by the selection of initiators, exotherm suppressants, catalysts, and antioxidants. Many combinations of these selections exist to control the heat of polymerization to 9.0 J/g-min or less, as demonstrated in the examples below. In some embodiments, the composition has a heat of polymerization that does not exceed 183 J/g, alternatively 156 J/g, alternatively 140 J/g.

Enthalpy change and heat generation can be measured by thermodynamic analysis, such as by Differential Scanning calorimetry (DSC). A sample is enclosed in a sample vessel prior to curing and subjected to identical temperature conditions as an empty reference vessel. The energy difference that is required to maintain the sample and reference vessels at the same temperature is recorded as a function of temperature. This energy released or absorbed is a measure of the enthalpy change (ΔH) of the sample with respect to the reference, more particularly of a change in internal energy of the sample. Generally, the enthalpy is substantially equivalent to heat or internal energy, though the enthalpy may differ from internal energy if the sample undergoes a change in pressure or volume. If a significant change occurs, such as if curing released gases in a confined volume, the enthalpy measure can be adjusted according to the following formula.

$$H = U + pV$$

where H is enthalpy, U is internal energy, p is pressure and V is volume. When curing is performed at atmospheric pressure, such adjustment is generally not needed.

The rate of enthalpy change during curing refers to the mean or average rate at which enthalpy changed from initiation to termination of substantial curing of the composition divided by the length of that period. Selection of the initiation and termination timepoints in DSC measurements are routinely based on experience and the shape of the curve and align with the deviation from and emergence with the base line. The amount of heat energy given in the art is total energy under the curve.

In some embodiments, the additive manufacturing composition is substantially free of gas voids. Unexpectedly the presence of gas voids affected the rate of enthalpy change and warpage. Testing showed when gaseous voids are eliminated from the printing part, the amount of heat generated per minute is reduced. Objects made with non-porous material exhibited no warpage. This is counterintuitive since a denser thermoset mixture contains more unsaturation per unit volume. It is believed that by eliminating gas-filled voids from the curing part, thermal expansion is reduced, thereby reducing the absolute change in volume from maximum expansion to maximum contraction. Such change being expressed in the art as "shrinkage." (See enthalpy measures in FIGS. 4 vs 5 and shrinkage and total compaction measures in FIG. 6). Accordingly, in some embodiments, the present compositions comprise gas voids as 10% or less, alternatively 5% or less, alternatively less than 4.1%, on a volume basis.

Compositions and methods disclosed herein are adapted for making objects by additive manufacturing. As used herein, "additive manufacturing" refers to making an object by adding material rather than removing material, such as by building one layer on top of a previous layer and encompasses various manufacturing and prototyping techniques known under a variety of names, including freeform fabrication, 3D printing, rapid prototyping/tooling, and others. Additive manufacturing can also refer to any method where an object is made by depositing layer upon deposited layer. Each layer will have the desired dimensions and shape such that together the layers form a three-dimensional, engineered structure.

As used herein, an "object" includes an article of manufacture, preferably a polymer composite article, made via additive manufacturing, for example, a polymer composite article made via large-scale additive manufacturing. It is contemplated that additive manufacturing may be used to make a facsimile of the object and other techniques, including subtractive techniques such as machining, may be used to finalize the object, which is still considered as made by additive manufacturing. In some embodiments, the present objects comprise a plurality of layers, for example, at least 10 layers, or at least 20 layers, or at least 100 layers, or more.

Large-scale additive manufacturing differs from small-scale (e.g., table-top) 3D printing in several respects. Large-scale additive manufacturing generally has dimensions on the order of feet or meters rather than inches or centimeters.

For example, the present methods and compositions can be used to provide objects having a size greater than one cubic meter. Build size can refer to the volume defined by the outer boundaries of the object. For example, a square open at both ends that has sides with a length of 2 m and a height of 3 m is said to have a build size of 12 m³, though the interior of the square is hollow. Large-scale additive manufacturing can refer to manufacturing objects having a length in an X and/or Y direction of at least 1 m, or a height in the Z-direction of at least 1 cm, or a build size of at least 0.01 m³.

In the present methods, additive manufacturing generally comprises depositing a layer or a bead of a cross-linkable thermosetting component, usually in a continuous or semi-continuous manner. As used herein, the term "depositing" includes applying, spraying, extruding, coating, spreading, or other technique by which a composition or material is positioned in a desired location. A machine may deposit a plurality of beads to form a layer. In some embodiments, an initial layer is deposited on a bed or support, and a subsequent layer is deposited on the initial layer. The initial layer can be deposited in X-Y directions, then the subsequent layer is deposited in the same X-Y directions but at a different location along the z-direction. The initial layer may begin curing before the subsequent layer is deposited on it. This may be a function of the nozzle's rate of movement in the X-Y directions. The initial layer will be at a deposit temperature when it is applied to a support. For a thermosetting material, the temperature will increase as the layer begins curing, since an exothermic curing reaction will release energy, leading to an increase in temperature. In some embodiments, the temperature of the initial layer will increase no more than 40° C., alternatively no more than 30° C., alternatively no more than 25° C. higher than its deposit temperature while curing, or will have a peak exotherm temperature no more than 50° C., or more than 45° C., or more than 40° C., as measured by thermal imaging (as exemplified in Example 4 below). In some embodiments, the temperature of the initial layer will have a peak exotherm temperature of 80° C. or less during curing, as measured by a Cup Peak Exotherm procedure (as exemplified in Example 7 below). Alternatively, the initial layer has a Cup Peak Exotherm that is no more than 75° C., 72° C., 68° C., 67° C. or 65° C. during curing. In some embodiments, the composition exhibits a peak exotherm that is no more than 40° C., or 35° C., or 30° C., or 25° C. higher than a temperature at which the composition begins to cure. In some embodiments, the composition has an enthalpy change at a rate of 9.0 J/g-min or less, alternatively 8.0 J/g-min or less, alternatively 7.1 J/g-min or less, alternatively 6.0 J/g-min or less.

The thermosetting material is deposited and begins to cure and then a next layer of the thermosetting material is applied to the curing layer. The curing layer heats the next layer, raising its temperature as it begins to cure. This transfer of heat from a first layer to a subsequent layer continues as layers are deposited.

Exothermic properties of the present methods and compositions can be characterized by peak exotherm (Peak Exo) and/or total time to peak exotherm (TTP). Peak exotherm is generally the highest temperature reached by a sample during curing, or it may be expressed as the difference between that highest point and a temperature when the sample begins curing or is deposited. In some embodiments, the combination of thermosetting material and initiator, along with process parameters are selected to maintain a peak exotherm temperature of 50° C. or less. In some embodiments, the composition or method has a peak exotherm temperature during curing of 50° C. or less, alternatively 45° C. or less, alternatively 42° C. or less, alternatively 40° C. or less, alternatively 38° C. or less, alternatively 37° C. or less, alternatively 35° C. or less. The foregoing peak exotherm temperatures occur when preferred embodiments of the present compositions are deposited and cured during additive manufacturing. Peak exotherms of individual layers deposited by additive manufacturing can be measured by thermal imaging or other suitable technique. Alternatively, the present methods and compositions can have a Cup Gel Peak Exotherm that is no more than 80° C., 75° C., 72° C., 68° C., 67° C. or 65° C. during curing. In some embodiments, the composition or method has a time to peak exotherm of 70 min or less, alternatively 60 min or less, alternatively 50 min or less, alternatively 40 min or less.

The present compositions and methods offer advantages over existing thermosetting technology by reducing cost and complexity, while also being able to accommodate the thermal and physical stresses of additive manufacture of large objects.

An additive manufacturing system or machine for forming an object on a layer-by-layer basis includes a nozzle fluidly connected to a source of a thermosetting component, and a motion control system connected to the nozzle for moving the nozzle in a predetermined pattern to form a layer of the component. In some embodiments, the additive manufacturing system further includes one or more pumps for pumping the thermosetting material (or one or more components of the thermosetting material) to the nozzle. The additive manufacturing system can further include a mixer for receiving and mixing one or more components of the thermosetting material. The system can also comprise a controller for controlling the rate and/or temperature at which the layers of the thermosetting material are deposited. The present methods can comprise the step of changing the temperature of the bead of thermosetting material deposited with a temperature controlling device.

In some embodiments, the rate of depositing the flowable material during additive manufacture is determined based on one or more of the gel time, peak exotherm, and time for depositing a layer.

An individual extruded bead is significantly larger (such as about 0.75 inch) than in small-scale additive manufacturing systems. The deposition rate can be at least 10 cm³/h, or at most 50 L/h.

In some embodiments, the present methods allow for manufacturing at atmospheric temperature, outside a chamber or oven that produces an elevated temperature relative to atmospheric. The methods can be done on a heated bed that provides an elevated temperature by contact, without a need to elevate the temperature of surrounding space.

The present methods and compositions enable manufacture of a large object by additive manufacturing, such as by using a thermosetting material, without significant deformation of the object or stresses between layers. As used herein, the term "deformation" refers to an unwanted difference from an intended or desired physical structure or form, and includes warpage, distortion, buckling, curving, or other deformity. In some embodiments, deformation can surprisingly be avoided without the use of shrink additives which are commonly included in thermosetting materials, but rather by reducing or limiting temperature differentials between layers, such as by selecting of cross-linkable components, initiator, and process parameters.

The present compositions include one or more cross-linkable component, such as a vinyl ester component, an unsaturated polyester component, and/or a urethane acrylate component.

Unsaturated polyester components are generally produced by a condensation reaction of an unsaturated di- or polycarboxylic acid or anhydride and a glycol and/or a polyhydric alcohol, optionally with a saturated di- or polycarboxylic acid or anhydride. The di- or polyfunctional organic acid or anhydride which may be employed are any of the numerous and known compounds. Suitable di- and polyfunctional acids or anhydrides thereof include, but are not limited to, maleic acid and anhydride, fumaric acid, citraconic acid, itaconic acid, glutaconic acid, phthalic acid and anhydride, isophthalic acid, terephthalic acid, tetrahydrophthalic anhydride, cyclohexane dicarboxylic acid, succinic anhydride, adipic acid, sebacic acid, azelaic acid, malonic acid, alkenyl succinic acids such as n-dodecenyl succinic acid, dodecylsuccinic acid, octadecenyl succinic acid, and anhydrides thereof. Lower alkyl esters of any of the above may also be employed. Mixtures of any of the above are suitable, without limitation intended by this.

Additionally, polyfunctional acids or anhydrides thereof having not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra(carboxymethyl)methane, 1,2,7,8-octane tetracarboxylic acid, citric acid, and mixtures thereof.

Suitable di- and polyhydric alcohols which may be used in forming the unsaturated polyester component include, but are not limited to, ethylene glycol, diethylene glycol, propylene glycol, dipropylene glycol, 1,3-butanediol, 1.4-butanediol, 1,3-hexanediol, neopentyl glycol, 2-methyl-1,3-pentanediol, 1,3-butylene glycol, 1,6-hexanediol, hydrogenated bisphenol A, cyclohexane dimethanol, 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methyl-propanetriol, 2-methyl-1,2,4-butanetriol, trimethylol ethane, trimethylol propane, and 1,3,5-trihydroxyethyl benzene. Mixtures of any of the above alcohols may be used.

Vinyl ester components are produced by the ring opening of an epoxy resin with an unsaturated monocarboxylic acid. In some embodiments, the vinyl ester component is prepared by the reaction between the vinyl containing organic acid such as methacrylic acid and an epoxide containing intermediate in the presence of a catalyst. In some embodiments, the vinyl ester resin is produced from the diglycidyl ether of bisphenol-A (DGEBA) and methacrylic acid, or from a reaction between glycidyl methacrylate with a multi-functional phenol. Any number of epoxide(s) can be used for the invention. Preferably the polyepoxide(s) include but are not limited to glycidyl methacrylate, glycidyl polyethers of both polyhydric alcohols and polyhydric phenols, bisphenol A epoxy, bisphenol F epoxy, glycidyl ester of neodecanoic acid, flame retardant epoxy resins based on tetrabromo bisphenol A, epoxy novolacs, epoxidized fatty acids or drying oil acids, epoxidized diolefins, epoxidized unsaturated acid esters as well as epoxidized unsaturated polyesters. Mixtures of the above may be employed. The polyepoxides may be monomeric or polymeric. Particularly preferred polyepoxides are glycidyl ethers of polyhydric alcohols or polyhydric phenols having equivalent weights per epoxide groups ranging from about 150 to about 1500, more preferably from about 150 to about 1000. Typically, the epoxy resin is based on bisphenol A (equivalent weight 180-500) and the monocarboxylic acid is methacrylic acid. Acrylic acid and derivatives can also be used. Novolac epoxy and blends of novolac and bisphenol A epoxies can also be used. Typically, the constituents are reacted in the ratio of 1 equivalent epoxy resin to 1 mole acid. An example of vinyl ester is bisphenol A glycidyl methacrylate, obtained by reacting bisphenol A epoxy resin with methacrylic acid.

In some embodiments, the present compositions comprise a core shell rubber-modified vinyl ester resin. As used herein, a "core shell rubber-modified vinyl ester resin" means a vinyl ester resin and a core shell polymer, wherein a core shell polymer having a rubbery core is dispersed throughout the vinyl ester resin. Suitable vinyl ester resins include the vinyl ester components set forth above.

Core shell polymers are generally produced by controlled emulsion polymerization during which the composition of the monomer feed is changed in order to achieve a desired compositional variation over the structure of the core shell polymer. While many core shell polymers having a variety of properties are available, the core shell polymers suitable for use in the present composition typically have a core which is rubbery at ambient conditions and is produced by polymerizing such monomers as butadiene and alkyl acrylates. By "rubbery at ambient conditions" it will be understood that the core of the core shell polymer has a Tg which is lower than the ambient temperature. Preferred core shell polymers include, but are not limited to, polymerized versions of: butadiene; butadiene and styrene; butadiene, methyl methacrylate and styrene; butadiene, alkyl methacrylate, and alkyl acrylate; butadiene, styrene, alkyl acrylate, alkyl methacrylate and methacrylic acid; butadiene, styrene, alkyl acrylate, alkyl methacrylate, methacrylic acid and low molecular weight polyethylene (as flow modifier); butyl acrylate and methyl methacrylate; alkyl methacrylate, butadiene and styrene; alkyl acrylate, alkyl methacrylate and glycidylmethacrylate; and alkylacrylate and alkylmethacrylate. The core shell polymer may comprise an average diameter of 50 to 350 nm; alternatively, 100 to 300 nm; alternatively, 150 to 250 nm; alternatively, about 200 nm; or alternatively, 200 nm. Exemplary core shell polymers for use in the present composition are those which incorporate butadiene as a core component and poly(methyl methacrylate) (PMMA) as a shell component. The core shell polymer may be amine terminated butadiene nitrile rubber (ATBN) nanoparticles.

In some embodiments, the present compositions comprise a reactive impact modifier component. Impact modifiers are additives that improve the impact strength of materials. The impact modifier may improve the impact strength of the additive manufactured product produced from the bead or particle by at least 10%, such as at least 20% or 30% compared to one not containing the impact modifier. Typically, the improved impact strength as defined above is measured by notched Izod impact strength according to the method described in ASTM D256 or ISO180.

In impact modified polymer beads of the present invention, the impact modifier may form elastomeric regions in the bead. Specifically, in the case of core-shell impact modified beads, the impact modifier may form discrete elastomeric phases in the bead and the acrylic or vinyl (co)polymer matrix forms a continuous phase in the bead. Still further, in addition or alternatively to forming elastomeric regions itself, the impact modifier may be polymerised into the acrylic or vinyl (co)polymer to form elastomeric regions in the polymer chains. Even further the impact modifier may crosslink the matrix (co)polymer and provide elastomeric regions in the resulting network or form branches off the matrix (co)polymer. Suitable impact modifiers of the aspects of the present invention are those known to one of ordinary skill in the art, and include, but are not limited to, core-shell, oligomers, reactive oligomers and (co)polymers. Suitable impact modifiers may include random, block, radial block, dendrimer, branched and/or graft polymer types.

In some embodiments, the impact modifiers are selected from acrylic (such as n-butyl acrylate-styrene), styrene (such as MBS and SBR), silicone (including silicone-acrylic), nitrile rubber, isoprene, butadiene, isobutylene and aliphatic polyurethane, polyether oligomer, polyester oligomer modifiers. Typically, the impact modifier can be an acrylic, butadiene, aliphatic polyurethane or silicone-acrylic impact modifier.

In some embodiments, the present compositions comprise a urethane acrylate component. As used herein, "urethane acrylate" means a reaction product of diisocyanate, an —OH functional molecule with a cross-linkable olefinic double bond, and optional mono-, di-, or multifunctional —OH containing material. As used herein "diisocyanates" means any type of aromatic, aliphatic, alicyclic and aromatic-aliphatic polyisocyanates, two or more isocyanate groups on each molecule; including dimers and trimers. Exemplary aromatic polyisocyanates include diphenylmethane diisocyanate (MDI) and toluene diisocyanate (TDI). Exemplary aliphatic polyisocyanates include hexamethylene diisocyanate (HDI) and isophorone diisocyanate (IPDI). The "—OH functional molecule with cross-linkable olefinic double bond" may include partial esters of polyhydric alcohols with acrylic acid or methacrylic acid, such as, for example, ethylene glycol monoacrylate or monomethylacrylate, 1,2- or 1,3-propanediol monoacrylate or monomethylacrylate, 1,4-butanediol monoacrylate or monomethylacrylate, 1,6-hexanediol monoacrylate or monomethacrylate, trimethylolpropane diacrylate, glycerol diacrylate, pentaerythritol triacrylate and the mono(N-methylolacrylamide)-ethers and mono-(N-methylolmethacrylamide)-ethers of ethylene glycol, propylene glycol, butanediol, hexanediol and neopentyl glycol. The "mono, di, or multifunctional OH containing material" may include polyfunctional alcohols, such as diols of 2 to 8 carbon atoms, for example ethylene glycol, propanediols, butanediols, pentanediols, hexanediols, triols, such as, for example, glycerol, trimethylolpropane and hexanetriols, pentaertythritol and the like; or polyether-polyols prepared by reaction of 1 molecule of alcohol with from 1 to 50, preferably 15 to 30 molecules, molecules of ethylene oxide or propylene oxide. Polyester polyols can include the reaction product of polycondensation of polybasic acids, such as adipic acid, succinic acid, azelaic acid, sebacic acid, phthalic acid, isophthalic acid and terephthalic acid, with polyhydric alcohols, such as 1,4-butanediol, 1,3-butanediol, ethylene glycol, diethylene glycol, propylene glycol, 1,2-propylene glycol, dipropylene glycol, 1,6-hexaneglycol and neopentyl glycol.

The present composition may further comprise one or more additives such as an air release/wetting agent, rheology modifier, thixotropic synergist, inhibitor, initiator, catalyst, surfactant, filler, and paraffin wax. The present composition may comprise more than one additive of the same type (e.g., one or more fillers) or a combination of additives of different types (e.g., at least one catalyst and at least one surfactant). When present, the one or more additives may comprise about 0.1 to about 60%; alternatively, about 0.1 to 50%;

alternatively, about 0.1 to 40%; alternatively, about 0.1 to 20%, or alternatively, about 0.1 to 15% of the total weight of the present composition.

In some embodiments, the additive manufacturing compositions and methods have a maximum linear shrinkage after curing or after forming an object, such as a linear shrinkage of less than 8.0%, alternatively less than 6.0%, alternatively less than 5.0%, alternatively less than 2.0%. In some embodiments, the additive manufacturing compositions and methods have a maximum total contraction after curing or after forming an object, such as a total contraction of less than 15.0%, alternatively less than 14.0%, alternatively less than 13.0%. It is also known that curable compositions tend to shrink when they cure, and that in some systems this tendency can be lessened or overcome by adding various polymeric additives; such additives are referred to as low profile additives (often abbreviated to "LPA"s). Low profile additives such as polystyrene, styrene-butadiene rubber and the like have been used in various radical polymerizable unsaturated resins. In some embodiments, the present compositions comprises a low profile agent or a shrink control additive, and in other embodiments, the present compositions are essentially free of a low profile agent or a shrink control additive.

The present composition may further comprise one or more ethylenically unsaturated monomers. The ethylenically unsaturated monomer can be any ethylenically unsaturated monomer capable of crosslinking the unsaturated polyester component or vinyl ester component via vinyl addition polymerization. Exemplary monomers include, but are not limited to styrene, methyl methacrylate, vinyl toluene, hydroxy methyl methacrylate, hydroxy methyl acrylate, hydroxy ethyl methacrylate, hydroxy ethyl acrylate, hydroxy propyl acrylate, hydroxy propyl methacrylate, alpha methyl styrene, and divinyl benzene. Further exemplary monomers include o-methyl styrene, m-methyl styrene, p-methyl styrene, methyl acrylate, t-butylstyrene, diallyl phthalate, triallyl cyanurate, trimethylolpropane triacrylate, trimethylolpropane trimethacrylate; ethoxylated trimethylolpropane triacrylate; glyceryl propoxy triacrylate; propylene glycol diacrylate; ethylene glycol diacrylate; ethylene glycol dimethacrylate; ethylene glycol diacrylate; tetraethylene glycol diacrylate; triethylene glycol dimethacrylate; tripropylene glycol dimethacrylate; polypropylene glycol diacrylate; polyethylene glycol dimeacrylate; butanediol diacrylate; butane-diol dimethacrylate; pentaerythlitol triacrylate; pentaerythritol tetra-acrylate; ethoxylated bisphenol A diacrylate; hexane diol diacrylate; dipentaerythritol monohydroxypentaacrylate; neopentyl glycol diacrylate; neopentyl glycol dimethacrylate; and tris(2-hydroxyethyl) isocyanurate triacrylate, and mixtures of two or more of the foregoing monomers. In some embodiments, the monomer is styrene or one of its derivatives. In other embodiments, the composition is substantially free of styrene and/or any of its derivatives. The monomer may comprise 0.1 to about 40%; alternatively, 0.1 to 40%; alternatively, 0.1 to 30%; or alternatively 0.1 to 20% of the total weight of the present composition.

The present composition may comprise a multi-part composition where each part is prepared separately and then combined prior to use. In these embodiments, the present composition comprises a first part comprising the crosslinkable component; and a second part comprising an initiator. The present composition may optionally further comprise a third part comprising a monomer or other components.

The present composition may comprise a multi-part composition where each part is prepared separately and then combined prior to or during deposition. In some embodiments, the present composition comprises a first part comprising a cross-linkable component (which may be a second portion of the same cross-linkable component contained in the first part, or a different one) and an accelerator; and a second part comprising the cross-linkable component and an initiator. In such multi-part compositions, it is desirable that the first part is free of the initiator and the second part is free of the accelerator, so that cross-linking is avoided or minimized prior to combining the first and second parts. In some embodiments, the first part and the second part are provided or mixed at ratios of about 1:1, or about 2:1, or about 10:1, or about 20:1, or about 50:1, or another ratio.

The present compositions can comprise an accelerator comprising copper containing complexes; quaternary ammonium or phosphonium salts; tertiary amines or phosphines; and/or optionally transition metal salts, as disclosed in Nava U.S. Pat. App. Publication No. 20160096918. In some embodiments, the accelerator comprises a component selected from cobalt naphthenate, cobalt octoate, cobalt hydroxide, potassium octoate, potassium naphthanate, a manganese salt, an iron salt, N,N-dimethylaniline, N,N-dimethyl-p-toluidine; or a combination thereof.

The present compositions or its parts may further comprise one or more additives. Suitable additives include inhibitors, antioxidants, rheology modifiers, air release/wetting agents, coloring agents, air release agents, inorganic or organic fillers, light weight fillers, surfactants, inorganic or organic nanoparticles, or combinations thereof. In some embodiments, the composition comprises an inhibitor selected from t-butyl catechol, hydroquinone, methyl hydroquinone, monomethyl ether of hydroquinone, copper naphthenate, and triphenyl antimony; or a combination thereof.

In some embodiments, the additive manufacturing compositions comprise a rheology modifier, which may be selected from silica, clay, organo-treated clay, castor oil, and a polyamide; or a combination thereof. In some embodiments, the air release/wetting agent is selected from polyacrylate, silicone, and mineral oil; or a combination thereof. In some embodiments, the coloring agent is selected from iron oxide, carbon black, and titanium oxide; or a combination thereof. In some embodiments, the filler comprises an organic or inorganic filler, such as an organic filler selected from polyethylene, a crosslinked polyester, a crosslinked acrylic, a crosslinked urethane, abs, graphite, and carbon fibers; or a combination thereof; or inorganic filler selected from calcium carbonate, clay, talc, wollastonite, fly ash, glass or polymeric microballoons, zinc sulfate, nano clay, nano silica, nano zinc, and glass fibers; or a combination thereof.

In some embodiments, it is advantageous to include one or more shrink control additives. However, an additional aspect of the present invention is that substantial deformation can be prevented without including shrink control additives. Accordingly, in some embodiments the present methods and compositions are essentially free of shrink additives such as polyvinyl acetate (PVAc), saturated polyester, PEG-400, PEG-600 Diacrylate, Styrene Butadiene Rubber, functionalized polystyrene, polyethylene, and cellulose acetate butyrate (CAB).

The term "initiator" generally includes compounds that may be referred to a catalysts, curing agents, hardeners or by other terms in the polymer industry, though certain contexts may indicate a different meaning for one or more of those terms.

In addition to the initiator, curing of the present composition can be facilitated using an organometallic compound, UV, electron beam, heat or peroxide systems. In some embodiments, curing is performed using UV light, an electron beam, an organometallic compound, a peroxide, or heat. In some embodiments, the curing is performed in an open or unheated environment, that is, outside an oven or other heating chamber. The open environment may include a bed on which the thermosetting material is deposited, where the bed is heated but the surrounding environment is not heated for the purpose of curing and is at ordinary room temperature (e.g., about 25° C., or between 22° C. and 28° C.). In some embodiments, the thermosetting material is deposited onto a bed, and the material exiting a nozzle has a temperature between 15 and 30° C., and the bed has a temperature between 15 and 30° C.

In some embodiments, where a peroxide system is employed as the initiator, the peroxide system may be a peroxide or hydroperoxide, preferably at concentrations from 0.5 to 4% by weight. Exemplary peroxides or hydroperoxides include, but are not limited to, benzoyl peroxide, lauroyl peroxide, cumene hydroperoxide, t-butyl hydroperoxide, methyl ethyl ketone peroxide (MEKP), t-butyl perbenzoate, and the like. In some embodiments, the initiator comprises a peroxide selected from cumene hydroperoxide, benzoyl peroxide, or blends of cumene hydroperoxide and methyl ethyl ketone peroxide. For example, the initiator can be cumene hydroperoxide.

In some embodiments, the composition comprises an initiator that initiates crosslinking at a slower rate and/or at a lower exotherm. For instance, the initiator may comprise cumene hydroperoxide or benzoyl peroxide. In some embodiments, the initiator does not comprise MEKP. The initiator composition may be a combination of an initiator, a catalyst such as a metal salt or complex, and/or other components that initiates crosslinking at a slower rate and/or at a lower peak exotherm. In some embodiments, the initiator is adapted so that the composition during curing does not exceed 9.0 J/g-min, alternatively 8.0 J/g-min, alternatively 7.1 J/g-min, alternatively 6.0 J/g-min.

Types of initiators that work at room temperature and could be used in the present compositions and methods include:

a. organic peroxides such as cumene hydroperoxide (CHP), benzoyl peroxide (BPO), blends of cumene hydroperoxide and methyl ethyl ketone peroxide (MEKP), peroxy(di)carbonate, peroxyesters, diacylperoxides, peroxyketals, dialkyl peroxides, and hydroperoxides; and inorganic peroxides, Ammonium persulfate, Hydroxymethanesulfinic acid monosodium salt dihydrate, Potassium persulfate, or Sodium persulfate. For example, the peroxide can be BPO, CHP, or a blend of CHP and MEKP.

b. photo initiators such as benzoin ethers, benzil ketals, alpha-dialkoxyacetophenones, alpha-hydroxyalkyl phenones, alpha-aminoalkylphenones, acylphosphine oxides, benzophenones/amines, thio-xanthones/amines, and titanocenes;

c. azo initiators such as 4,4'-Azobis(4-cyanovaleric acid), 1,1'-Azobis(cyclohexanecarbonitrile), Azobisisobutyronitrile; 2,2'-Azobis(2-methylpropionitrile).

The additive manufacturing compositions can also comprise a reinforcing material such as synthetic or natural fibers. Polymer composite materials often are a combination of small fibers (glass, carbon, aramid) and a thermosetting resin such as unsaturated polyester, epoxy, phenolic, polyimide, polyurethane and others. Thermosetting resins can be reinforced with glass fibers, carbon fibers, aramid fibers, basalt fibers (geotextile fibers) or natural fibers. For example, the reinforcing material can be a continuous fiber extruded with the thermosetting material or discontinuous fibers that are distributed in the thermosetting material, such as discontinuous fibers selected from the group of materials consisting of carbon, glass, and aramid. The reinforcement can be a mixture of two or more of the above reinforcement materials.

Thermosetting materials undergo curing, which is an exothermic, irreversible chemical reaction in which the low molecular weight liquid converts to a high molecular weight, cross-linked solid. An intermediate change during curing is gelation, when the reaction has proceeded sufficiently so that the thermosetting material has achieved a flexible but non-flowing three-dimensional molecular structure. Gelation is accompanied by a release of energy, resulting in a temperature rise. The material is no longer liquid or flowable. Thus, gel time is a factor in the manufacture of all composites and gel temperature is important for thick or large cross section composites. ISE, the geltime range of the present compositions is 10-50 min, and preferably 20-25 min. The total time to peak energy release is 35-70 min.

The average thickness of the additive manufacturing composition applied by the additive manufacturing system may range from 1.27 to 127 mm; alternatively, 2.54 to 63.5 mm; alternatively, 3.81 to 25.4 mm; alternatively, 5.08 to 20.32 mm; alternatively, 5.08 to 19.05 mm; alternatively, 5.08 to 15.24 mm; or alternatively; about 6.35 mm; or alternatively, 6.35 mm to achieve the performance noted herein. In some embodiments, the thermosetting material is deposited in an amount sufficient to achieve a layer with a thickness of 0.1016 to 0.254 mm, preferably 0.1524 to 0.127 mm. Furthermore, in some methods of application, the present composition may be applied as a layer in a single or a series of applications to achieve a layer in the range of 0.1016 to 25.4 mm, preferably 0.1524 to 2.032 mm.

In some embodiments, the present methods and compositions are employed to manufacture a substrate, as opposed to a coating on a substrate. The cured composition shows no or minimal evidence of dimensional changes such as warping. One skilled in the art would readily appreciate what no or minimal evidence of dimensional changes represents. A cured composition without substantial deformation may still have some deformation without having unacceptable deformation. For example, acceptable deformation encompasses deformation of 0.25 inch or less from a plane of printing or depositing, alternatively 1 cm or less, alternatively 0.5 cm or less. As another example, no or minimal evidence of dimensional changes represents a finished product with less than 0.10 mm warping on a 914.4 mm (L)×228.6 mm (H)×19.05 mm (W) part. In some embodiments, the present compositions, when cured, display less than 5% deformation, alternatively less than 2.5% deformation, alternatively less than 1% deformation, from a plane of printing or depositing.

In some embodiments, the present compositions, when cured, may shrink by greater than 8.0%, but without substantial deformation of the object made by the composition. An exemplary embodiment of the present composition and method resulted in linear shrinkage of less than 6% and exhibited no observable deformation. Testing was performed on a TA Ares G2 rheometer.

The present methods and compositions can be employed to make objects of any shape, size, or use. Preferably, the object is a polymer composite article. Examples of objects that can be made via large-scale additive manufacturing methods disclosed herein include molds, prototypes, support beams, furniture, core structures, and other objects.

While specific embodiments have been described in detail, it will be appreciated by those skilled in the art that various modifications and alternatives to those details could be developed considering the overall teachings of the disclosure. In particular, the present methods described herein may be used in any number of different ways and in different applications not necessarily involving objects made by additive manufacturing. Accordingly, the disclosure herein is meant to be illustrative only and not limiting as to its scope and should be given the full breadth of the appended claims and any equivalents thereof.

EXAMPLES

Example 1

In this example, compositions are prepared with the components and steps set forth in Table 1. More particularly, each composition comprises a crosslinkable component (a vinyl ester and/or an unsaturated polyester, and a monomer), a cobalt accelerator and an amine. The compositions of Table 1 can be combined with an initiator to form additive manufacturing composition and initiate curing of the composition.

TABLE 1

| | | 1A | 1B | 1C | 1D | 1E | 1F | 1G |
|---|---|---|---|---|---|---|---|---|
| Vinyl ester (VE) resin | 1 | 67.96 | | | | | 20.58 | 21.00 |
| Low VOC VE resin | 1 | | 60.96 | | | | | |
| DCPD resin | 1 | | 8.48 | | 60.15 | 60.15 | 40.27 | 41.09 |
| Orthophthalic resin | 1 | | | 70.45 | | | | |
| Inhibitor A | 1 | 0.0074 | 0.0073 | | 0.01 | 0.01 | 0.007 | 0.008 |
| Inhibitor B | 1 | 0.011 | 0.022 | | | | 0.011 | 0.023 |
| Inhibitor C | 1 | | | 0.018 | 0.013 | 0.013 | | |
| wetting agent | 1 | 0.45 | 0.36 | 0.37 | 0.33 | 0.33 | 0.45 | 0.46 |
| rheology modifier | | 0.34 | 0.36 | 0.37 | 0.33 | 0.33 | 0.34 | 0.35 |
| air release agent | 1 | 0.45 | 0.36 | 0.37 | 0.33 | 0.33 | 0.45 | 0.46 |
| Metal salt A | 1 | 0.37 | 0.29 | 0.22 | 0.17 | 0.17 | 0.28 | 0.29 |
| Metal salt B | 1 | 0.092 | 0.073 | 0.073 | 0.017 | 0.017 | 0.057 | 0.058 |
| Metal salt C | 1 | 0.26 | 0.00 | 0.00 | 0.00 | 0.00 | | |
| Tertiary amine A | 1 | 0.11 | 0.11 | 0.00 | 0.10 | 0.10 | 0.11 | 0.12 |
| Tertiary amine B | 1 | 0.074 | 0.036 | 0.15 | 0.00 | 0.00 | 0.057 | 0.058 |
| Vinylic monomer | 1 | 4.17 | 1.56 | 1.73 | 5.14 | 5.14 | 11.39 | 11.61 |
| Low-profile additive | 1 | | | | 7.40 | 7.40 | | |
| dye/Pigment | 1 | 0.0037 | 0.0037 | 0.0037 | 0.00 | 0.00 | 0.00 | 0.00 |
| talc | 2 | 14.93 | 0.00 | 15.00 | 15.0 | 15.0 | 15.0 | 18.0 |

TABLE 1-continued

|  | | 1A | 1B | 1C | 1D | 1E | 1F | 1G |
|---|---|---|---|---|---|---|---|---|
| calcium carbonate | 2 | 0.00 | 12.0 | 0.00 | 0.00 | 0.00 | 0.00 | 0.00 |
| Glass reinforcing fiber | 2 | 4.98 | 5.00 | 5.00 | 5.00 |  | 5.0 | 18.0 |
| Carbon reinforcing fiber | 2 |  |  |  |  | 5.00 |  | 0.00 |
| fumed silica | 3 | 1.49 | 3.00 | 1.50 | 1.50 | 1.50 | 1.5 | 2.0 |
| castor oil derivative | 3 | 4.47 | 7.00 | 4.50 | 4.50 | 4.50 | 4.50 | 4.50 |

Example 2

In this example, the compositions of Example 1 are combined with a second part comprising cumene hydroperoxide (CHP) or benzoyl peroxide (BPO) as an initiator.

TABLE 2

|  | 2A | 2B | 2C | 2D | 2E | 2F | 2G |
|---|---|---|---|---|---|---|---|
| first part | 1A | 1B | 1C | 1D | 1E | 1F | 1G |
| second part | CHP | CHP | CHP | CHP | CHP | CHP | CHP |
|  | 2H | 2I | 2J | 2K | 2L | 2M | 2M |
| first part | 1A | 1B | 1C | 1D | 1E | 1F | 1G |
| second part | BPO | BPO | BPO | BPO | BPO | BPO | BPO |

Example 3

In this example, the composition of Example 2A was used in a large-area additive manufacturing machine at Oak Ridge National Laboratory to make objects having a build size of 91 cm (L)×91 cm (W)×18 cm (D) in the shape of a vacuum forming mold for sanitaryware. The crosslinkable component and initiator component were combined in a mixer of the additive manufacturing system and fed to a nozzle. The object was formed by depositing a series of layers, with the initial layer being deposited on a heated bed having a temperature of 25° C. The layers were deposited at a deposit temperature of 25° C. The steady state temperature measured for the thermosetting material was <50° C. and the time to peak exotherm measured to be 36.1 min. The thermosetting material was deposited by the nozzle of the system at a rate of 68.6 mm/sec.

Figure 7:
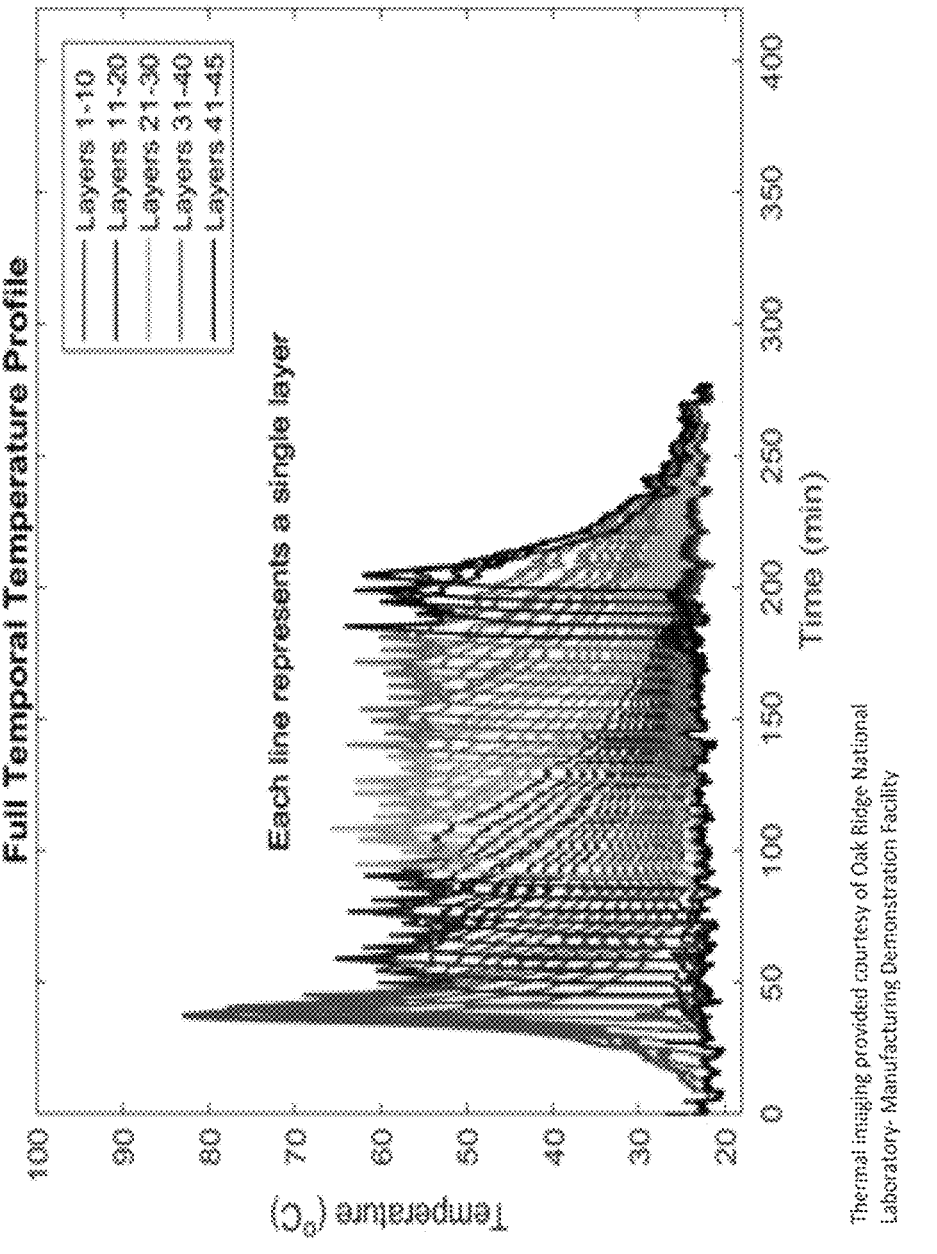
FIG. 7 shows a temperature assessment for a series of layers of thermosetting material having a relatively high peak exotherm.

The temperature of the deposited layers was assessed, and the results are shown in FIG. 1. The temperature of the first ten layers was higher than the other layers but leveled off at layers 15-20. In contrast, an additive manufacturing composition comprising a "hotter" initiator, CHM-50, exhibited significantly higher temperatures as layers were deposited, with temperatures in layers 1-10 approaching and exceeding 80° C. FIG. 7 illustrates data from thermal imaging of layers deposited with such a composition. The additive manufacturing composition comprising CHM-50 resulted in an object having unacceptable deformation in the form of curling, while the composition of Example 2A did not have significant deformation.

Example 4

In this example, a series of layer of additive manufacturing compositions were deposited using the additive manufacturing system at Oak Ridge, and the temperature of the deposited layers was assessed. The additive manufacturing composition of Example 2A was deposited at a rate of 68.6 mm/sec.

Figure 2:
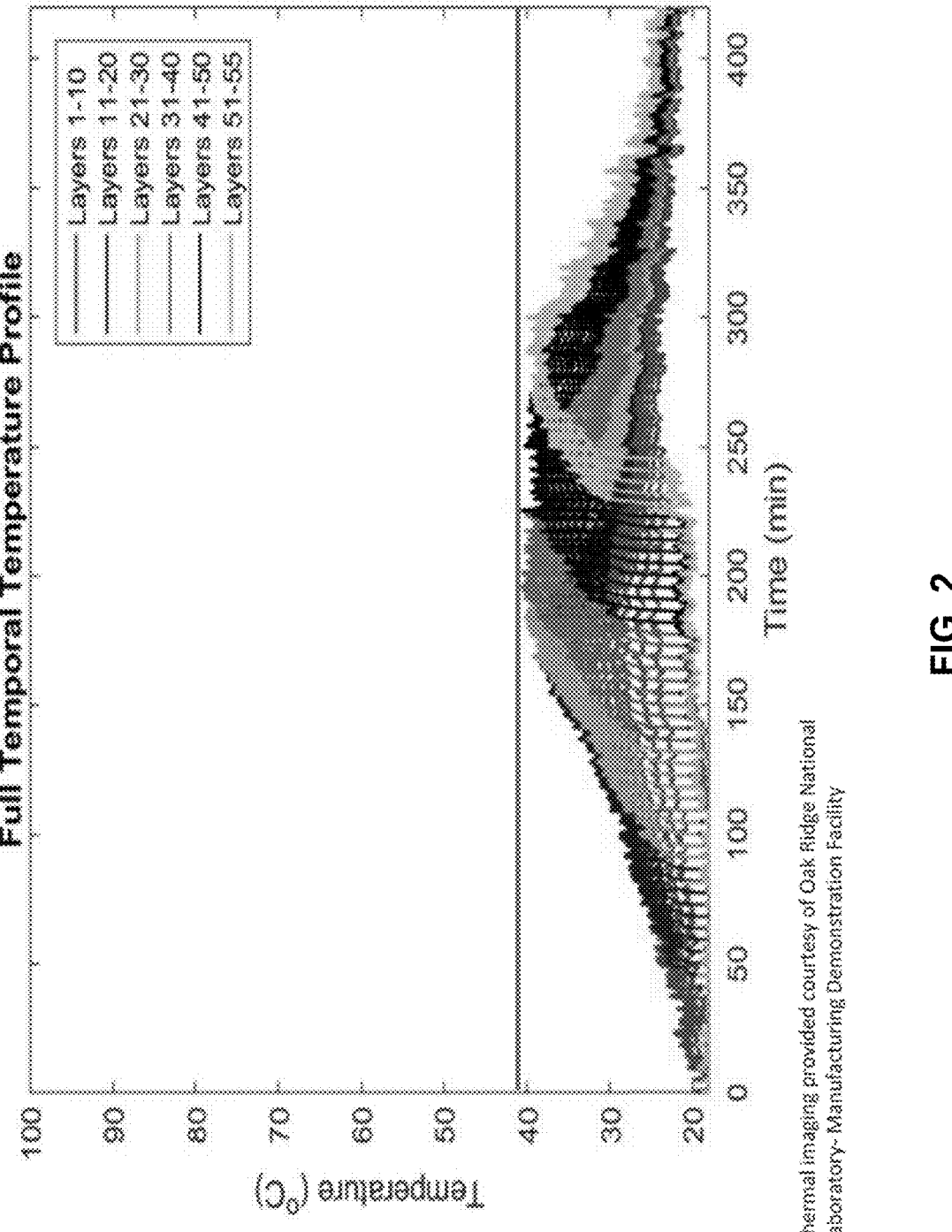

FIGS. 1 and 2 show a temperature assessment for a series of layers of thermosetting material deposited in two conditions. In FIG. 1, a CHP system with gas voids was deposited, and the maximum temperature difference between layers was 27° C. In FIG. 2, a CHP system substantially without gas voids was deposited, and the maximum temperature difference between layers was 18° C. FIGS. 1 and 2 were provided courtesy of Dr. Vlastimil Kunc and the Manufacturing Demonstration Facility of Oak Ridge National Laboratory.

Example 5

Figure 3:
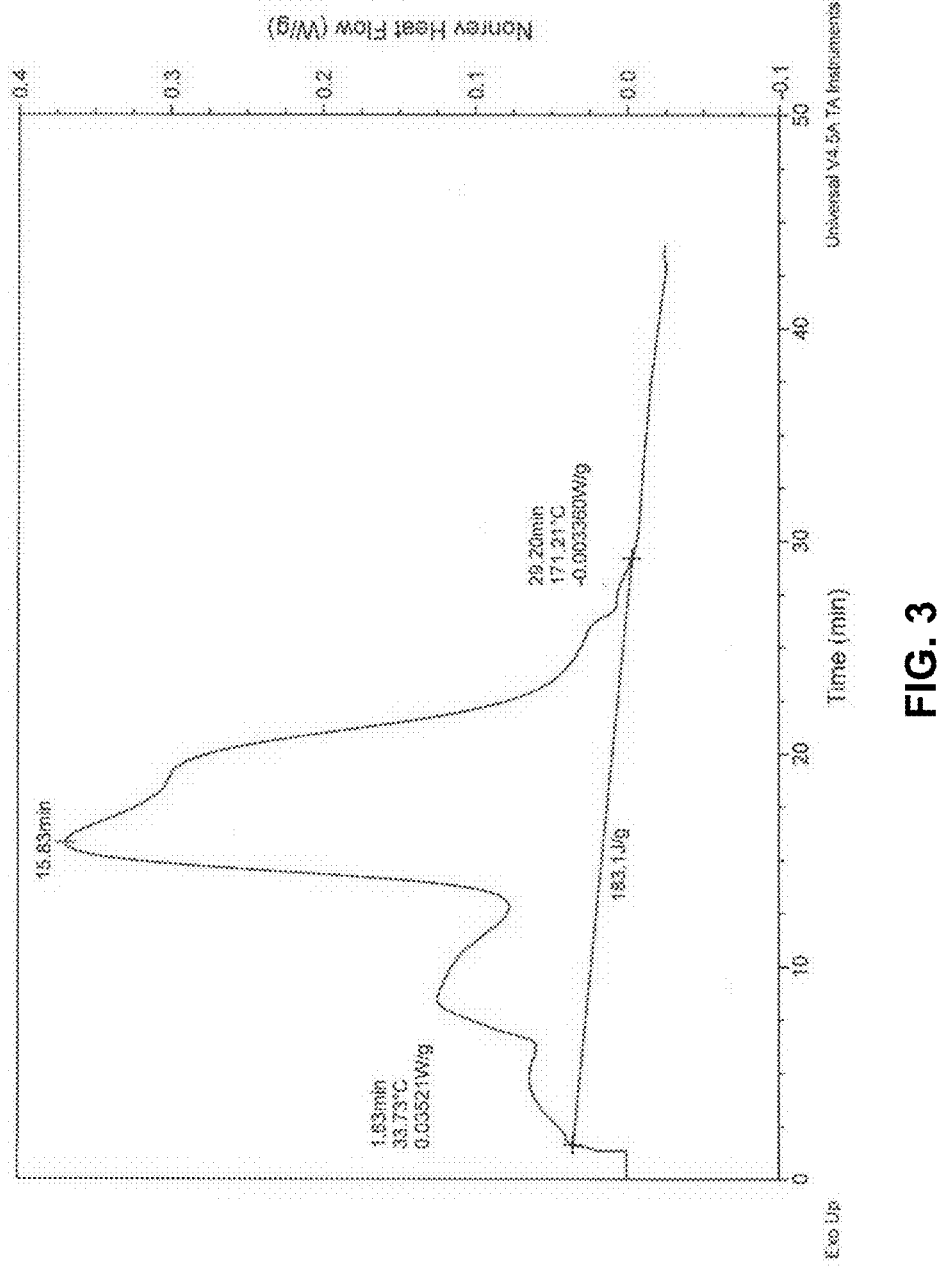
FIG. 3 shows the rate of energy created during the curing of the embodied invention.

In this example, a series of layer of additive manufacturing compositions were deposited using the additive manufacturing system at Oak Ridge, and the temperature of the deposited layers was assessed. The additive manufacturing composition of Example 2A was deposited at a rate of 68.6 mm/sec. FIG. 3 shows the rate of energy created during the curing of the composition.

Figure 4:
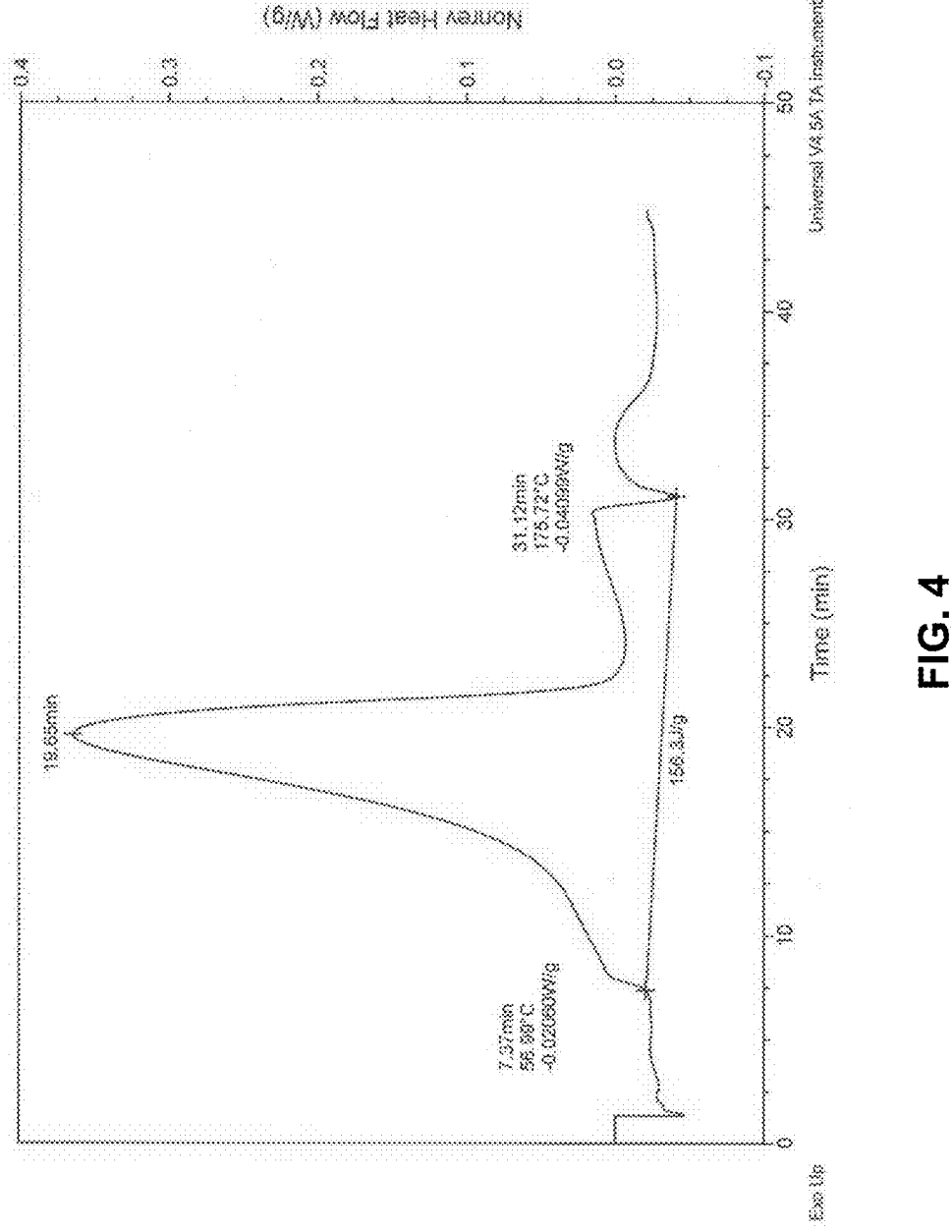
FIGS. 4 and 5 show the rate of energy created when curing a thermosetting material containing gas voids versus a de-gassed material.
Figure 5:
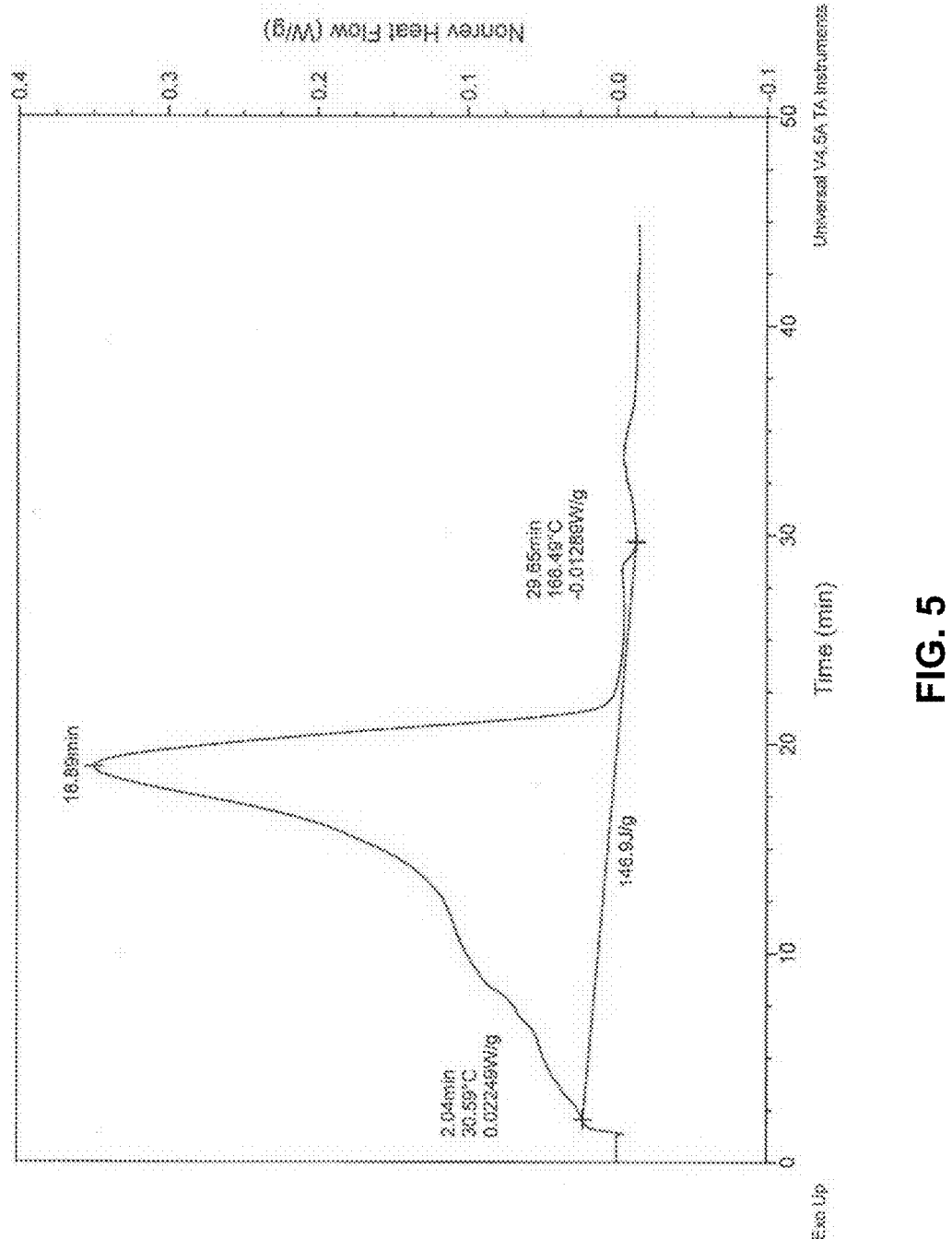

FIGS. 4 and 5 show the rate of energy created by an air-containing versus de-aired additive manufacturing compositions comprising a BPO initiator system. In FIG. 4, the composition included gas voids and the rate of enthalpy change was 6.58 J/g-min. In FIG. 5, the composition was substantially free of gas voids, and the rate of enthalpy change was 5.32 J/g-min. The object manufactured in accordance with FIG. 5 has less deformation than the object of FIG. 4.

Example 6

This example describes several embodiments of the present additive manufacturing compositions, which are prepared with the components set forth in Tables 3 and 4. More particularly, each composition comprises a crosslinkable component (a vinyl ester and/or an unsaturated polyester, and a monomer) and other components. The compositions of Tables 3 and 4 can be combined with an initiator such as CHP or BPO to form additive manufacturing compositions.

TABLE 3

| Formula | EXP-1593 | A | B | D | F | G | H | I | T |
|---|---|---|---|---|---|---|---|---|---|
| Vinyl ester resin | 59.59% | | | | | | | | |
| Urethane-modified vinyl ester resin | | 68.01% | | | 23.22% | 17.79% | | | 68.009% |
| Styrene-free UPR | | | 62.77% | | | | | | |
| DCPD-based UPR | | | 8.73% | 68.78% | 45.45% | 34.81% | | | |
| DCPD-based UPR | | | | | | | 68.78% | 68.80% | |
| Quinone inhibitor A | 0.0065% | 0.0074% | 0.0076% | 0.011% | 0.0079% | 0.0068% | 0.011% | 0.011% | 0.007% |
| Hydroxy terminated antioxidant | 0.0097% | 0.011% | 0.0227% | | 0.012% | 0.0195% | | | 0.011% |
| Quinone inhibitor B | | | | 0.015% | | | 0.015% | | |
| Filler wetting agent | 0.40% | 0.45% | 0.37% | 0.377% | 0.51% | 0.39% | 0.377% | 0.377% | 0.410% |
| Rheological coupling agent | 0.30% | 0.34% | 0.37% | 0.377% | 0.38% | 0.30% | 0.377% | 0.377% | 0.324% |
| Air release additive | 0.29% | 0.45% | 0.37% | 0.377% | 0.51% | 0.39% | 0.377% | 0.377% | 0.300% |
| Metal salt A | 0.32% | 0.37% | 0.30% | 0.19% | 0.32% | 0.25% | 0.19% | 0.19% | 0.370% |
| Metal salt B | 0.08% | 0.09% | 0.08% | 0.019% | 0.06% | 0.05% | 0.019% | 0.019% | 0.090% |
| Metal salt C | 0.024% | 0.026% | | | | | | | 0.028% |
| Tertiary amine A | 0.10% | 0.11% | 0.11% | 0.11% | 0.12% | 0.10% | 0.11% | 0.11% | 0.110% |
| Tertiary amine B | 0.07% | 0.07% | 0.04% | | | 0.06% | 0.05% | 0.015 | 0.174% |
| Talc | 12.46% | 14.94% | | 17.153% | 16.93% | 15.25% | 17.153% | 17.153% | 14.984% |
| ¹⁄₁₆" glass fiber | | 4.98% | 5.15% | 5.718% | 5.64% | 15.25% | 5.718% | 5.718% | 4.995% |
| ¹⁄₁₆" carbon fiber | | | 12.36% | | | | | | |
| Rheological additive A | 1.31% | 1.49% | 3.09% | 1.71% | 1.69% | 1.69% | 1.71% | 1.71% | 1.498% |
| Rheological additive B | 3.93% | 4.47% | 4.63% | 5.15% | 5.08% | 3.81% | 5.15% | 5.15% | 4.495% |
| Rheological additive C | 17.45 | | | | | | | | |
| Styrene monomer | 3.67% | 4.17% | 1.61% | | | 9.84% | | | 4.196% |
| Total | 100.00% | 100.00% | 100.00% | 100.00% | 100.00% | 100.00% | 100.00% | 101.50% | 100.00% |

TABLE 4

| Formula | P | Q | R | S |
|---|---|---|---|---|
| Styrene-free UPR resin blend | 71.69% | 60.26% | 71.73% | 60.22% |
| Quinone inhibitor A | 0.05% | 0.05% | 0.05% | 0.05% |
| Metal salt A | 0.39% | 0.33% | 0.39% | 0.33% |
| Metal salt B | 0.10% | 0.08% | 0.10% | 0.08% |
| Metal salt C | 0.03% | 0.02% | 0.03% | 0.02% |
| Tertiary amine A | 0.12% | 0.10% | 0.12% | 0.10% |
| Tertiary amine B | 0.22% | 0.42% | 0.22% | 0.39% |
| Hindered amine antioxidant | 0.16% | 0.16% | 0.16% | 0.16% |
| Triacrylate monomer | | | | 18.14% |
| Diacrylate monomer A | | | 6.69% | |
| Diacrylate monomer B | | 18.07% | | |
| Acrylate monomer | 6.73% | | | |
| Talc | 11.84% | 11.84% | 11.84% | 11.84% |
| ¹⁄₁₆" glass fiber | 3.95% | 3.95% | 3.95% | 3.95% |
| Rheological additive A | 1.18% | 1.18% | 1.18% | 1.18% |
| Rheological additive B | 3.54% | 3.55% | 3.55% | 3.55% |
| Total | 100.00% | 100.00% | 100.00% | 100.00% |

Composition A was combined with 2.0% CHP and found to cure without substantial deformation when deposited in a series of layers. Composition A also cured without substantial deformation with 2.5% CHP. Composition T was combined with 2.5% LV-40 and found to cure without substantial deformation when deposited in a series of layers. However, undesirable deformation was observed for Composition T when combined with 2.0% LV-40. Undesirable deformation was observed for Composition A when combined with 1.0% CHM-50.

Example 7

In this example, some of the additive manufacturing compositions of Example 6 were analyzed to determine gel time, cure time, and Exotherm at Room Temperature. More particularly, this example used the following procedure for determining the gel, total-time to peak and peak exotherm of promoted or unpromoted resins when catalyzed with specified peroxide. Appropriate safety measures were followed.

The example used a temperature recorder with 0 to 500° F. (or to 250° C.) range or equivalent with a Type J thermocouple interface, capable of speeds of 30"/hour or 60"/hour, and accurate to ±4° F. (±2° C.). The example also used a grounded type J thermocouple, iron-constantan, 6" sheathed in stainless steel. A pipette having 5 ml capacity with 0.05 ml graduations with precision of ±0.05 ml was used to run this test. A constant temperature water bath was maintained at 25±0.2° C., and the surrounding environment was maintained at a temperature of 25±2° C.

The example followed the following procedure. An amount (50±0.1 grams) of a resin was weighed into a 100 ml polypropylene beaker. A metal spatula, wooden tongue depressor, or thermometer was inserted into the beaker. If the wooden tongue depressor is used, it must be coated ½ inch above the resin level with previously weighed resin to prevent absorption of cobalt solution, catalyst or any additional additives. The beaker containing the resin was placed into a constant temperature water bath at 25±0.2° C. Sufficient time was allowed for the resin sample to equilibrate to 25±0.2° C. If a thermometer is used to facilitate resin temperature adjustment it must remain in the sample until after the catalyst has been added and thoroughly dispersed. A catalyst of the type and amount specified in Table 5 was added into the test resin and mixed thoroughly for one minute in the water bath. Air entrapment was avoided while mixing.

The sample was checked periodically by lifting the spatula or tongue blade to observe the resin flow rate watching for signs of gelation. The sample should not be stirred when checking it. The point at which the resin ceases to flow and "snaps" off the stick back into the beaker is considered the gel point and the elapsed time from catalyst addition to the gel point is considered its "Cup Gel Time". The gel time is recorded, but the time of the example continues to run.

Upon reaching the gel time, the beaker is immediately removed from the water bath and placed on a non-heatconductive surface (i.e., wood). The thermocouple is inserted so that the tip of the thermocouple is located 3/16 inch from the beaker's bottom and within the center of the resin sample surface. Time and temperature are observed, and the time elapsed from catalyst addition to the peak temperature is identified as "Total Time to Peak". The maximum temperature reached is reported as the "Cup Gel Peak Exotherm". Cup Gel Peak Exotherm differs from Peak Exotherm measured by thermal imaging of deposited layers (as shown in FIGS. 1 and 2).

Results of the example are shown in Table 5 below:

TABLE 5

| Sample ID | Catalyst | Geltime, min. | $^{\circ}T$ at geltime, $C^{\circ}$ | Cup Gell Peak Exotherm, $C^{\circ}$ | $\Delta T^{\circ}$, $C^{\circ}$ |
|---|---|---|---|---|---|
| $A_1$ | 2.0% CHP | 24.8 | 36.1 | 67.2 | 31.1 |
| $A_2$ | 2.5% CHP | 22.8 | 38.9 | 65.0 | 26.1 |
| $A_3$ | 1.0% CHM-50 | 15.0 | 37.2 | 95.5 | 58.3 |
| B | 2.0% CHP | 25.6 | 36.1 | 93.9 | 57.8 |
| D | 2.5% LV-40 | 13.4 | 36.3 | 61.7 | 25.4 |
| F | 2.5% LV-40 | 14.1 | 35.6 | 83.9 | 48.3 |
| G | 2.5% CHP | 19.2 | 41.1 | 63.3 | 22.2 |
| H | 2.0% LV-40 | 13.7 | 34.8 | 66.7 | 31.9 |
| I | 2.5% LV-40 | 14.8 | 35.6 | 75.6 | 40.0 |
| P | 2.0% LV-40 | 12.8 | 33.9 | 67.2 | 33.3 |
| Q | 2.0% LV-40 | 14.5 | 32.2 | 46.0 | 13.8 |
| R | 2.0% LV-40 | 14 | 31.7 | 60.0 | 28.3 |
| S | 2.5% LV-40 | 19.6 | 37.2 | 39.4 | 2.2 |
| $T_1$ | 2.0% LV-40 | 12.5 | 37.8 | 81.1 | 43.3 |
| $T_2$ | 2.5% LV-40 | 30.0 | 35.9 | 55.0 | 19.1 |
| EXP-1593$_1$ | 2.0% LV-40 | 13.4 | 33.9 | 90.1 | 56.2 |
| EXP-1593$_2$ | 2.5% CHP | 28.8 | 37.2 | 70.5 | 33.3 |

These results demonstrate that some embodiments of the present compositions exhibit a cylindrical mass peak exotherm (e.g., a Cup Gel Peak Exotherm) that does not exceed 80° C., when curing in a 50 g mass. In some embodiments, the present additive manufacturing compositions may have a Cup Gel Peak Exotherm that is no more than 80° C., 75° C., 72° C., 68° C., 67° C. or 65° C. during curing. These results also demonstrate that some embodiments of the present compositions exhibit a peak exotherm that is no more than 40° C. higher than a temperature at which the composition begins to gel, alternatively no more than 35° C. or 32° C. or 30° C.

Example 8

In this example, Differential Scanning calorimetry (DSC) analysis was performed on some of the present compositions. This analytical procedure is suitable for analyzing additive manufacturing compositions containing initiated, curing thermoset resins and various fillers and additives. The analysis was performed using a TA Instruments Q2000 and/or Q200 DSC (differential scanning calorimeter) and associated Tzero DSC press and Tzero pans with hermetic lids.

The DSC analysis employed the following steps. Using a disposable plastic pipette weigh out a minimum of twenty-five grams of the sample into a disposable 150 ml polypropylene beaker. Using a disposable glass pipette and squeeze bulb weigh out the appropriate initiator and concentration of the initiator to the same 150 ml polypropylene beaker. Stir the mixture of sample and initiator with a tongue depressor for two minutes. Using a cylindrical wood applicator stick add 4 mg to 20 mg of the sample/initiator mixture to the bottom of a tared DSC pan. Record the weight of the sample. Using the DSC Tzero press and hermetic seal die set seal the sample lid to the sample pan. Load the DSC hermetically sealed sample pan/lid and a hermetically sealed reference empty pan/lid into the DSC cell onto their respective sample and reference posts. Close the cell lid and make sure the system autosampler has been disabled. Make sure the nitrogen purge gas is set to 50 ml/minute. For the Q2000 DSC make sure the RCS 90 mechanical chiller is turned on. For the Q200 DSC make sure the air supply set to the FACS (fin air-cooled system) is set to 20 psi. In the TA Instruments Thermal Advantage software enter the sample (and pan/lid weights, if applicable), the sample ID and the data file name. Make sure the DSC instrument method includes the following parameters: Equilibrate at 30° C.; Isothermal hold for 3 mins.; Ramp from 30° C. to 200° C. at 10° C./min.; Mark end of heat cycle; Data storage off. Press the green arrow button in the Thermal Advantage software to begin analysis.

Results from the DSC analysis were obtained as follows. The TA Instruments Universal Analysis software was used to integrate the cure exotherm(s) and calculate the results. The exothermic peak(s) were identified as follows. With the TA Universal Analysis software exothermic signal is always upward and positive in value while endothermic signal is always downward and negative in value. Click the "integrate peak linear" button from the row of buttons just above the plot of Heat flow (Watts/gram) as a function of Temperature (° Celsius). Place the two cursors on the baseline both to the left and to the right of the exothermic peak; choose the closest straight line segment immediately to the left and the right of the peak for placement of the cursors. Click "enter" to perform the integration and calculation of the onset of enthalpy, peak maximum of enthalpy and heat enthalpy of the exotherm (Joules/gram). Record all three values. Right click on the endpoint of the exotherm signal by visually identifying the point at which the signal first returns to baseline and click "Enter" to stamp the endpoint in ° C. If more than one exothermic peak is present then each exotherm must be integrated individually and the total enthalpy of cure is the sum of the enthalpies of all exotherms. Print a hardcopy of and generate a PDF of the thermogram plot of Heat flow (W/g) vs Temperature (° C.). Convert the X-axis to Time units (min) and stamp the onset and end of the exotherm(s) in units of time using the same procedure for stamping the endpoint of the exotherm in temperature; print a hardcopy of and generate a PDF of the thermogram plot of Heat flow (W/g) vs Time (min). In the formal report record onset and peak maximum of each exothermic peak to rounded to the nearest whole degree Celsius and cure enthalpy to the nearest Joule/gram. Remember to take the sum of the enthalpies for all exothermic peaks present to record the total enthalpy of cure.

Table 6 summarizes the results of the DSC analysis.

TABLE 6

| Sample ID | Catalyst | Total Enthalpy, J/g | Enthalpy Rate, J/g-min |
|---|---|---|---|
| $A_1$ | 2.0% CHP | 154.0 | 8.72 |
| $A_2$ | 2.5% CHP | 183.2 | 6.64 |
| $A_3$ | 1.0% CHM-50 | 179.8 | 12.38 |
| B | 2.0% CHP | 134.3 | 6.80 |
| D | 2.5% LV-40 | 109.4 | 8.67 |
| F | 2.5% LV-40 | 213.4 | 12.63 |
| G | 2.5% LV-40 | 209.3 | 11.54 |
| H | 2.0% LV-40 | 117.1 | 8.65 |
| I | 2.5% LV-40 | 188.4 | 11.20 |
| P | 2.0% LV-40 | 39.1 | 3.39 |
| Q | 2.0% LV-40 | 8.4 | 2.91 |
| R | 2.0% LV-40 | 109.1 | 7.81 |

23

24

TABLE 6-continued

| Sample ID | Catalyst | Total Enthalpy, J/g | Enthalpy Rate, J/g-min |
|---|---|---|---|
| S | 2.5% LV-40 | 39.7 | 3.13 |
| $T_1$ | 2.0% LV-40 | 115.8 | 9.79 |
| $T_2$ | 2.5% LV-40 | 146.9 | 5.32 |
| EXP-1593$_1$ | 2.0% LV-40 | 98.0 | 7.09 |

These results demonstrate that some embodiments of the present additive manufacturing compositions have a rate of enthalpy change of less than 9.0 J/g-min, alternatively less than 8.0 J/g-min, alternatively less than 7.1 J/g-min.

Example 9

When thermosetting compositions undergo curing, they tend to undergo expansion followed by shrinkage. It is believed that deformation may result form excessive shrinkage and/or excessive total contraction by an additive manufacturing composition during curing. As used herein, total contraction refers to the absolute difference between the point of maximum expansion to the point of and maximum shrinkage (both in percentages of the gap height of the test composition in the parallel plate rheometer procedure below).

In this example, shrinkage and total contraction during curing are tested for some embodiments of the present additive manufacturing compositions. The test procedure was done using a parallel plate rheometer capable of acting under axial force control and having temperature control capability. The rheometer was equipped with –25 mm plates. Prior to performing the linear shrinkage test, it is desirable to obtain some pre-testing data for the compositions, such as: (1) gel time, interval, and peak exotherm for the test composition, with full exotherm curve capture out to at least 1 hour past peak exotherm; (2) the strain sweep rheology of the test composition to identify linear elastic response region; and (3) standard 3D printing rheology testing data (with 50 $s^{-1}$ flow) to identify storage modulus recovery at 1 minute post shear.

The test procedure should be performed with close coordination between the chemist handling the initiation portion of the test and the analytical chemist running the rheometer. The test procedure was performed as follows. 50 g of a test sample (Compositions A, B, D, F, G, H, I, P, Q, R, S, T and EXP-1593 from Example 6) was placed in 250 mL beaker. The quantity of initiator designated in Table 6 was added. A timer was started and the sample was stirred with a metal spatula, taking care to scrape sides and bottom of container for 1 minute. Material from spatula was scraped back into container with tongue depressor, and the sample as stirred again for 30 seconds. Material from spatula was scraped back in to container with tongue depressor. The sample was applied to the rheometer plate, and the rheometer was started using these initial rheometer settings: (note time of rheometer start relative to initiation time): Temperature: 30 C; Gap Target: 1 mm; Axial Load Control: Set to maintain ON load; and 1 Hz oscillation to linear elastic strain region identified by strain sweep (pre test #2). 1 Hz oscillation was continued until storage modulus reaches 100 kPa or 3× the storage modulus reached in the recovery phase of rheology testing (pre test #3), whichever is higher. This is designated as the gel point. Oscillation is halted, and the temperature is ramped to the peak exotherm for the test sample over the course of a recorded interval time (from pre test #1). The sample is then cooled down at a rate to simulate cool down curve (from pre test #1).

Figure 6:
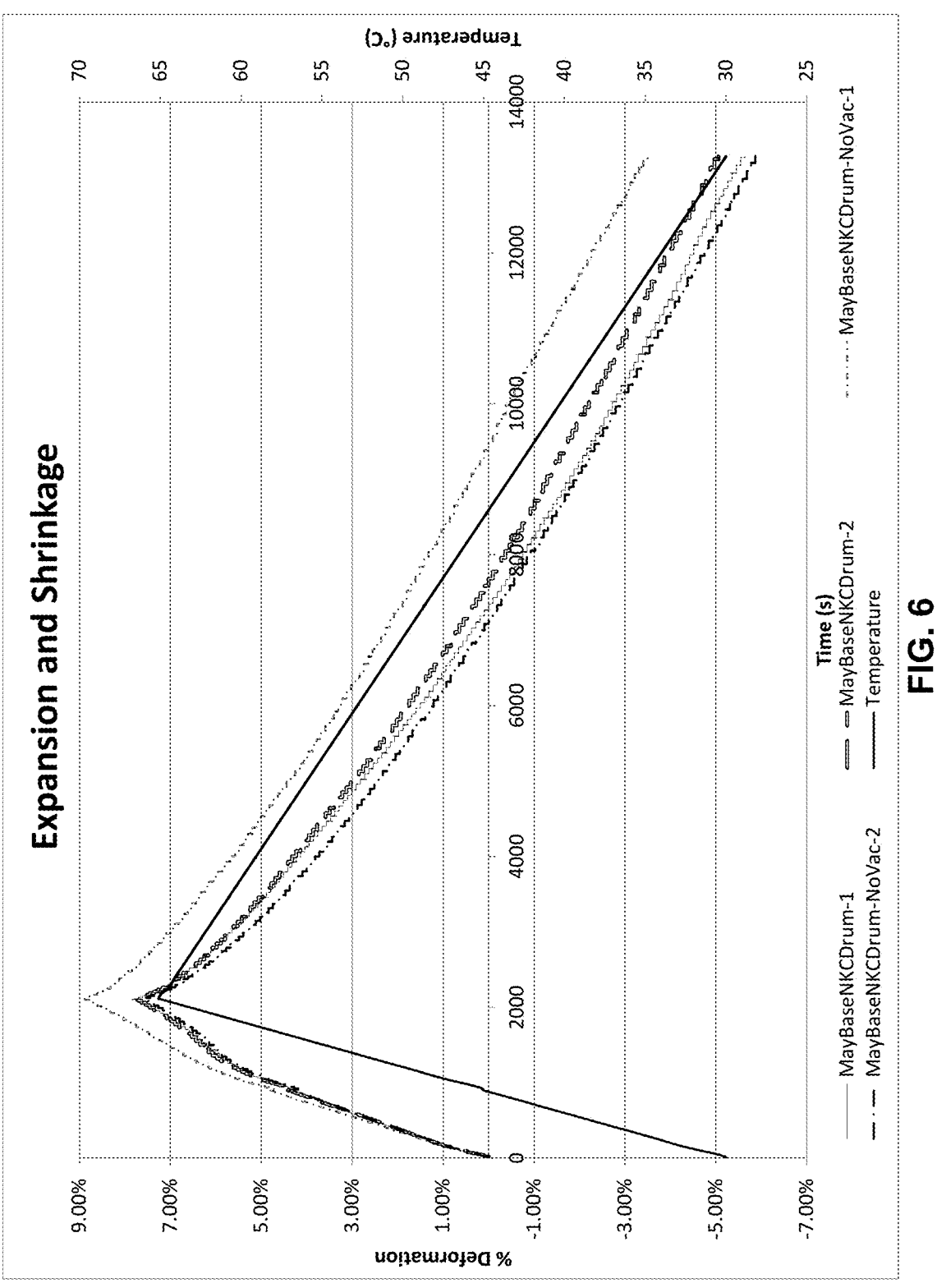
FIG. 6 shows data from testing contraction and shrinkage of embodiments of the present compositions.

Data collected from this testing includes contraction from an initial gap (which is referred to as "Shrinkage") and total gap change from maximum expansion to maximum contraction (referred to as "Total Contraction"). Results of the example are shown in Table 7 below and in FIG. 6. FIG. 6 is a graph of the expansion and shrinkage measured from two batches of Composition A (MayBaseNKCDrum-1 and MayBaseNKCDrum-2). Each batch was tested with degassing (to provide a composition substantially free of gas voids) and without degassing (MayBaseNKCDrum-No-Vac-1 and MayBaseNKCDrum-NoVac-2). The left axis of FIG. 6 indicates percentage change, and the right axis indicates temperature. FIG. 6 illustrates that the test samples exhibiting expansion between 7% and 9% accompanied by an increase in temperature from about 30° C. to between 65° C. and 70° C. As the temperatures of the test samples decreased, the material reduced to its initial gap height and continued reducing, exhibiting shrinkage between 3% and 6%.

TABLE 7

| Sample ID | Catalyst | Expansion, % | Contraction from Initial Gap, % | Total Contraction, % |
|---|---|---|---|---|
| $A_1$ | 2.0% CHP | 6.38 | 5.80 | 11.42 |
| $A_2$ | 2.0% CHP | 7.76 | 5.35 | 13.11 |
| B | 2.0% CHP | 13.53 | 5.72 | 17.16 |
| D | 2.5% LV-40 | 6.33 | 4.57 | 10.24 |
| F | 2.5% LV-40 | 13.02 | 5.23 | 16.15 |
| G | 2.5% CHP | 4.60 | 6.63 | 10.74 |
| H | 2.0% BPO | 8.44 | 4.68 | 12.08 |
| I | 2.5% LV-40 | 8.94 | 5.49 | 13.24 |
| P | 2.0% LV-40 | 7.57 | 4.91 | 11.60 |
| Q | 2.0% LV-40 | 2.38 | 4.02 | 6.25 |
| R | 2.0% LV-40 | 5.49 | 5.53 | 10.44 |
| S | 2.5% LV-40 | 2.46 | 1.66 | 4.02 |
| $T_1$ | 2.0% LV-40 | 13.73 | 4.92 | 16.39 |
| $T_2$ | 2.5% LV-40 | 3.77 | 5.94 | 9.71 |
| EXP-1593$_1$ | 2.0% LV-40 | 14.36 | 2.15 | 14.42 |
| EXP-1593$_2$ | 2.5% CHP | 6.73 | 6.24 | 12.15 |

The results demonstrate that several embodiments of the present additive manufacturing compositions have a linear contraction of less than about 15.0%, alternatively less than about 14.0%.

EXEMPLARY EMBODIMENTS

As an additional aid in understanding the present disclosure, the following exemplary embodiments are provided. Before the various embodiments are described, it is to be understood that the teachings of this disclosure are not limited to the particular embodiments described:

Embodiment 1. An additive manufacturing composition comprising a thermosetting material comprising a cross-linkable component; and an initiator of free-radical cross-linking; wherein, when the composition is deposited in a series of layers, the composition cures without substantial deformation.

Embodiment 2. The composition of embodiment 1, wherein the composition has a peak exotherm temperature of 50° C. or less during curing as one or more deposited layers (such as when curing as multiple deposited layers), and/or a time to peak exotherm of less than 70 min. Alternatively or additionally, the composition has a peak exotherm temperature less than 80° C., 75° C., 72° C., 68° C., 67° C. or 65° C. during curing as a cylindrical mass.

Embodiment 3. The composition of embodiment 1 or embodiment 2, wherein, when the composition is curing, the composition exhibits a peak exotherm that is no more than 30° C. higher than a temperature at which the composition begins to cure, alternatively no more than 35° C. higher, alternatively no more than 40° C. higher. In some embodiments, the composition when curing exhibits a peak exotherm that is no more than 30° C. higher than a temperature at which the composition is deposited as a layer, alternatively no more than 35° C. higher, alternatively no more than 40° C. higher.

Embodiment 4. The composition of any of the foregoing embodiments, wherein the composition has a rate of enthalpy change equal to or less than 9.0 J/g-min, alternatively equal to or less than 8.0 J/g-min, alternatively equal to or less than 7.1 J/g-min, alternatively equal to or less than 6.0 J/g-min.

Embodiment 5. The composition of embodiment 1, wherein the composition is substantially free of gas voids, before curing and/or during curing.

Embodiment 6. The composition of any of the foregoing embodiments, wherein the cross-linkable component is a vinyl ester component or an unsaturated polyester component.

Embodiment 7. The composition of any of the foregoing embodiments, wherein the initiator comprises a peroxide selected from cumene hydroperoxide, benzoyl peroxide, or blends of cumene hydroperoxide and methyl ethyl ketone peroxide.

Embodiment 8. The composition of any of the foregoing embodiments, wherein the composition has a maximum linear shrinkage of less than about 9%, or less than about 8%, or less than about 7.1%. Alternatively or additionally, the composition has a maximum total contraction of less than about 15%, alternatively less than about 14%, alternatively less than 13%.

Embodiment 9. An object prepared by curing the additive manufacturing composition of any of the foregoing embodiments, wherein the object comprises a plurality of layers.

Embodiment 10. The object of embodiment 9, wherein at least one of the layers has a length in the X and/or Y direction of 1.0 m or more.

Embodiment 11 The object of embodiment 9 or embodiment 10, wherein the object comprises at least 10 layers.

Embodiment 12. A method of additive manufacturing an object comprising depositing a first layer of thermosetting material on a support at a deposit temperature; curing the first layer of the thermosetting material, wherein the peak exotherm temperature during curing is no more than 30° C. higher than the deposit temperature, alternatively no more than 32° C. higher or 35° C. higher. In some embodiments, the thermosetting material is selected from any of embodiments 1 to 8.

Embodiment 13. The method of embodiment 12, further comprising depositing a second layer of thermosetting material on the first layer opposite the support while the first layer undergoes exothermic reaction, and the first layer releases heat to the second layer. In some embodiments, the second layer of thermosetting material is selected from any of embodiments 1 to 8.

Embodiment 14. The method of embodiment 12, further comprising: depositing a third layer of the thermosetting material on the second layer and opposite the first layer and the support; curing the thermosetting material deposited as the third layer; and optionally, depositing and curing additional layers until the desired height of the object is achieved. In some embodiments, the third layer of thermosetting material is selected from any of embodiments 1 to 8.

Embodiment 15. The method of any of embodiments 12 to 14, comprising applying a first series of layers, wherein the layers of the first series have a mean peak temperature (MPT) during curing; depositing a second series, where the MPT of the second series is within 25° C. of the MPT of the first series.

Embodiment 16. The method of embodiment 15 wherein the first series releases heat to the second series.

Embodiment 17. The method of any of embodiments 12 to 16, wherein the depositing step comprises depositing the thermosetting material to achieve a layer with a thickness of 1.27 to 12.7 mm.

Embodiment 18. The method of any of embodiments 12 to 17, wherein the curing of the thermosetting material is at atmospheric temperature, or at a temperature of 20° C. to 50° C.

Embodiment 19. The method of any of embodiments 12 to 18, wherein the curing of the thermosetting material is performed without applying secondary energy.

The preceding description describes, illustrates and exemplifies one or more particular embodiments. This description is not provided to limit the disclosure to the embodiments described herein, but rather to explain and teach various principles to enable one of ordinary skill in the art to understand these principles and, with that understanding, be able to apply them to practice not only the embodiments described herein, but also other embodiments that may come to mind in accordance with these principles. The scope of the present disclosure is intended to cover all such embodiments that may fall within the scope of the appended claims, either literally or under the doctrine of equivalents. The present disclosure notes that various embodiments are disclosed herein, at least including:

What is claimed is:

1. An additive manufacturing composition comprising:
   a thermosetting material comprising a cross-linkable component, wherein the cross-linkable component comprises a vinyl ester component or an unsaturated polyester component; and
   an initiator of free-radical cross-linking, wherein the initiator is a peroxide system;
   wherein, when the composition is deposited in a series of layers, the composition cures without substantial deformation; and
   wherein the composition has a rate of enthalpy change of 9 J/g-min or less.

2. The composition of claim 1, wherein the composition has a peak exotherm temperature of 50° C. or less during curing as one or more deposited layers.

3. The composition of claim 1, wherein the initiator comprises a peroxide selected from cumene hydroperoxide, benzoyl peroxide, or blends of cumene hydroperoxide and methyl ethyl ketone peroxide.

4. The composition of claim 1, wherein the composition has a linear shrinkage of 6.0% or less.

5. The composition of claim 1, wherein the composition has a total contraction of 15.0% or less.

6. The composition of claim 1, wherein the composition is essentially free of low profile agents and shrink control additives.

7. An object prepared by curing the additive manufacturing composition of claim 1, wherein the object comprises a plurality of layers.

8. The object of claim 7, wherein at least one of the layers has a length in the X and/or Y direction of 1.0 m or more.

9. An object prepared by curing an additive manufacturing composition, wherein the additive manufacturing composition comprises:

a thermosetting material comprising a cross-linkable component, wherein the cross-linkable component comprises a vinyl ester component or an unsaturated polyester component; and an initiator of free-radical cross-linking, wherein the initiator is a peroxide system;

wherein, when the composition is deposited in a series of layers, the composition cures without substantial deformation; and wherein, when the composition is curing, the composition exhibits a peak exotherm that is no more than 40° C. higher than a temperature at which the composition begins to cure; and wherein the object comprises a plurality of layers.

10. The object of claim 9, wherein at least one of the layers has a length in the X and/or Y direction of 1.0 m or more.

11. The object of claim 10, wherein the object comprises at least 10 layers.

12. A method of additive manufacturing an object comprising:

depositing a first layer of thermosetting material on a support at a deposit temperature;

curing the first layer of the thermosetting material, wherein the peak exotherm temperature during curing is no more than 40° C. higher than the deposit temperature; and depositing a second layer of thermosetting material on the first layer opposite the support while the first layer undergoes exothermic reaction, and the first layer releases heat to the second layer.

13. The method of claim 12, further comprising:

depositing a third layer of the thermosetting material on the second layer and opposite the first layer and the support;

curing the thermosetting material deposited as the third layer; and optionally, depositing and curing additional layers until the desired height of the object is achieved.

14. The method of claim 12, comprising applying a first series of layers, wherein the layers of the first series have a mean peak temperature (MPT) during curing;

depositing a second series, where the MPT of the second series is within 25° C. of the MPT of the first series.

15. The method of claim 14 wherein the first series releases heat to the second series.

16. The method of claim 12, wherein the depositing step comprises depositing the thermosetting material to achieve a layer with a thickness of 1.27 to 12.7 mm.

17. The method of claim 12, wherein the curing of the thermosetting material is at atmospheric temperature.

18. The method of claim 12, wherein the curing of the thermosetting material is performed without applying secondary energy.

19. The method of claim 12, wherein the curing of the thermosetting material is at a temperature of 20° C. to 50° C.

20. The method of claim 12, wherein the thermosetting material is deposited onto the support at a temperature between 15 and 30° C., and the support has a temperature between 15 and 30° C.

* * * * *